(12) United States Patent
Shuman et al.

(10) Patent No.: US 9,350,662 B2
(45) Date of Patent: May 24, 2016

(54) SERVER MEDIATED PEER-TO-PEER COMMUNICATION OFFLOADING FROM NETWORK INFRASTRUCTURE

(71) Applicant: QUALCOMM Incorporated, San Diego, CA (US)

(72) Inventors: Mohammed Ataur Rahman Shuman, San Diego, CA (US); Amit Goel, San Diego, CA (US); Sandeep Sharma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 41 days.

(21) Appl. No.: 14/335,292

(22) Filed: Jul. 18, 2014

(65) Prior Publication Data

US 2016/0021007 A1    Jan. 21, 2016

(51) Int. Cl.
| | |
|---|---|
| *H04L 12/801* | (2013.01) |
| *H04L 29/08* | (2006.01) |
| *H04W 28/02* | (2009.01) |
| *H04W 28/08* | (2009.01) |
| *H04W 76/02* | (2009.01) |

(Continued)

(52) U.S. Cl.
CPC ............. *H04L 47/12* (2013.01); *H04L 67/104* (2013.01); *H04W 28/0289* (2013.01); *H04W 28/08* (2013.01); *H04W 76/023* (2013.01); *H04W 88/06* (2013.01); *H04L 63/30* (2013.01); *H04W 92/18* (2013.01)

(58) Field of Classification Search
None
See application file for complete search history.

(56) References Cited

U.S. PATENT DOCUMENTS

| | | | |
|---|---|---|---|
| 8,332,484 B2 | 12/2012 | Afergan et al. | |
| 8,468,131 B2 | 6/2013 | Stelzig | |

(Continued)

FOREIGN PATENT DOCUMENTS

| | | |
|---|---|---|
| KR | 20140046510 A | 4/2014 |
| WO | 2014067875 A1 | 5/2014 |

OTHER PUBLICATIONS

Bao X., et al., "DataSpotting: Exploiting Naturally Clustered Mobile Devices to Offload Cellular Traffic," In proceeding of IEEE Infocom, 2013, pp. 420-424.

(Continued)

*Primary Examiner* — Ayaz Sheikh
*Assistant Examiner* — Peter Chau
(74) *Attorney, Agent, or Firm* — Muncy, Geissler, Olds & Lowe, P.C.

(57) ABSTRACT

The disclosure generally relates to offloading communication from a network infrastructure to direct peer-to-peer communication. In particular, a server may receive peer-to-peer status information over the network infrastructure from at least two client devices that intend to communicate, wherein the peer-to-peer status information may include at least coarse or precise location information associated with the client devices. The server may then instruct the client devices to communicate over a direct peer-to-peer connection that bypasses the network infrastructure in response to determining that the location information received from the client devices and other conditions permit offloading the communication from the network infrastructure. For example, the server may determine whether the communication can be offloaded based at least in part on whether an estimated distance between the client devices falls within a maximum range associated with one or more peer-to-peer interfaces supported on one or more of the client devices.

30 Claims, 16 Drawing Sheets

(51) Int. Cl.
*H04W 88/06* (2009.01)
*H04L 29/06* (2006.01)
*H04W 92/18* (2009.01)

(56) References Cited

U.S. PATENT DOCUMENTS

| | | | |
|---|---|---|---|
| 8,521,886 B2 | 8/2013 | Patil et al. | |
| 8,635,335 B2 | 1/2014 | Raleigh et al. | |
| 2003/0118014 A1* | 6/2003 | Iyer | H04N 5/782 370/389 |
| 2006/0160544 A1* | 7/2006 | Sun | H04W 8/18 455/456.1 |
| 2007/0111742 A1 | 5/2007 | Zhang et al. | |
| 2007/0129076 A1 | 6/2007 | Cho et al. | |
| 2009/0023460 A1 | 1/2009 | Cho et al. | |
| 2009/0034447 A1 | 2/2009 | Yu et al. | |
| 2010/0261469 A1 | 10/2010 | Ribeiro et al. | |
| 2012/0185605 A1* | 7/2012 | Patil | H04W 76/023 709/228 |
| 2013/0290696 A1 | 10/2013 | Broustis et al. | |
| 2013/0301438 A1* | 11/2013 | Li | H04W 76/048 370/252 |
| 2013/0324114 A1* | 12/2013 | Raghothaman | H04W 76/023 455/426.1 |
| 2013/0336230 A1* | 12/2013 | Zou | H04W 72/085 370/329 |
| 2014/0032771 A1* | 1/2014 | Pegg | H04L 67/32 709/228 |
| 2014/0115058 A1* | 4/2014 | Yin | H04W 76/023 709/204 |
| 2014/0192667 A1* | 7/2014 | Kalapatapu | H04W 52/0209 370/252 |
| 2014/0192737 A1* | 7/2014 | Belghoul | H04W 76/023 370/329 |
| 2015/0043438 A1* | 2/2015 | Fwu | H04W 28/24 370/329 |
| 2015/0074396 A1* | 3/2015 | Naslund | H04L 63/0807 713/168 |

OTHER PUBLICATIONS

Mazurek M.L., et al., "ZZFS: A hybrid device and cloud file system for spontaneous users," In Conference on File and Storage Technologies (FAST), 2012, Carnegie Mellon University, Pittsburgh, PA, 13 pages.
International Search Report and Written Opinion—PCT/US2015/037854—ISA/EPO—Oct. 7, 2015.
"3rd Generation Partnership Project; Technical Specification Group Services and System Aspects; Feasibility study for Proximity Services (ProSe) (Release 12)", 3GPP Standard; 3GPP TR 22.803, 3rd Generation Partnership Project (3GPP), Mobile Competence Centre; 650, Route Des Lucioles; F-06921 Sophia-Antipolis Cedex; France, vol. SA WG1, No. V12.2.0, Jun. 28, 2013, pp. 1-45, XP050711962, [retrieved on Jun. 28, 2013] Section 1 Section 5.1.9.
Lin X., et al., "An Overview of 3GPP Device-to-Device Proximity Services", IEEE Communications Magazine, IEEE Service Center, Piscataway, US, vol. 52, No. 4, Apr. 2014, pp. 40-48, XP011546525, ISSN: 0163-6804, DOI: 10.1109/MCOM.2014.6807945, [retrieved on Apr. 29, 2014].

* cited by examiner

SERVER MEDIATED PEER-TO-PEER COMMUNICATION OFFLOADING FROM NETWORK INFRASTRUCTURE

TECHNICAL FIELD

The disclosure generally relates to offloading network infrastructure communication to peer-to-peer (P2P) communication between endpoints in a server-mediated manner.

BACKGROUND

Wireless communication systems have developed through various generations, including a first-generation analog wireless phone service (1G), a second-generation (2G) digital wireless phone service (including interim 2.5G and 2.75G networks) and third-generation (3G) and fourth-generation (4G) high speed data/Internet-capable wireless services. There are presently many different types of wireless communication systems in use, including Cellular and Personal Communications Service (PCS) systems. Exemplary cellular systems include the cellular Analog Advanced Mobile Phone System (AMPS), digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies. More recently, Long Term Evolution (LTE) has been developed as a wireless communications protocol for mobile phones and other terminals to communicate data at high speeds. LTE is based on GSM, and includes contributions from various GSM-related protocols such as Enhanced Data rates for GSM Evolution (EDGE) and Universal Mobile Telecommunications System (UMTS) protocols such as High-Speed Packet Access (HSPA).

Accordingly, communications systems and devices are becoming increasingly diverse with new technological advancements. Communications devices are now able to support various different communications technologies and protocols. Indeed, not only can various communications devices operate in a communications system (e.g., over a network infrastructure), many communications device may communicate with one another using direct peer-to-peer (P2P) communications and/or using infrastructure elements where devices communicate through signals communicated via one or more base stations, access points, or other network infrastructure entities. For example, communications devices that support the Wi-Fi Direct standard may connect to each other via direct P2P connections and communicate at typical Wi-Fi speeds with minimal setup and without requiring any wireless access point. Furthermore, the LTE Direct standard uses licensed spectrum and the LTE physical layer to provide a scalable and universal framework through which equipped communications devices can discover and connect to proximate peers and thereby establish direct P2P connections within ranges up to approximately 500 meters, whereas Wi-Fi direct tends to require the devices to be in closer proximity.

As noted above, one or more intermediate base stations, access points, or other infrastructure elements typically facilitate communication between two or more wireless devices or other endpoints over a network infrastructure (e.g., through uplink and downlink channels between the endpoints and the infrastructure elements). However, at times, the loading conditions on the infrastructure elements (e.g., at a base station serving one or more wireless devices), may become excessive and thereby degrade communications quality. Furthermore, in certain cases, direct P2P communication may be faster, more efficient, more private, or otherwise advantageous to end users. Accordingly, network operators and end users can realize substantial benefits from using different P2P technologies to offload traffic from the network infrastructure, especially when two or more devices seeking to communicate are located in proximity to one another and can establish a direct P2P connection with reasonably good quality. However, direct P2P communication may be undesirable under other circumstances because always having P2P interfaces on may impact battery life, raise privacy or security concerns (e.g., where an end user does not want to be discoverable to third parties that may be unknown or otherwise untrusted), and/or interfere with enforcing lawful intercept requests, among other things.

Accordingly, in view of the above discussion, it should be appreciated that a need exists for systems that can determine appropriate conditions where traffic between two or more wireless devices seeking to communicate can be offloaded from a network infrastructure to direct P2P communications and vice versa.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments disclosed herein in a simplified form to precede the detailed description presented below.

According to one exemplary aspect, a method for offloading communication from a network infrastructure may comprise, among other things, receiving location information from a first wireless device and location information from a second wireless device over the network infrastructure, determining whether communication between the first wireless device and the second wireless device can be offloaded from the network infrastructure based at least in part on the location information received from the first wireless device and the location information received from the second wireless device, and instructing the first wireless device and the second wireless device to communicate over a peer-to-peer connection that bypasses the network infrastructure in response to determining that the communication between the first wireless device and the second wireless device can be offloaded from the network infrastructure. For example, in one embodiment, determining whether the communication between the first wireless device and the second wireless device can be offloaded from the network infrastructure may comprise estimating a distance between the first wireless device and the second wireless device based on the received location information, identifying one or more peer-to-peer technologies supported on the first wireless device and the second wireless device based on one or more peer-to-peer status reports received from the first wireless device and the second wireless device, and determining that the communication between the first wireless device and the second wireless device can be offloaded from the network infrastructure in response to the estimated distance falling within a range associated with the one or more peer-to-peer technologies supported on the first wireless device and the second wireless device. Additionally, where the estimated distance falls within the range associated with multiple peer-to-peer technologies supported on the first wireless device and the second wireless device, the peer-to-peer technology that the first wireless device and the second wireless device use to establish the peer-to-peer connection may be selected according to one or more user-specific, device-specific, operator-specific, and/or other preferences.

According to another exemplary aspect, the method may further comprise updating the estimated distance between the first wireless device and the second wireless device based on subsequent location updates that are provided in one or more intermittent reports received from the first and second wireless devices and instructing the first and second wireless devices to communicate over the network infrastructure in response to the updated distance falling outside the range associated with the peer-to-peer technologies supported thereon. Alternatively (and/or additionally), the wireless devices may be instructed to communicate over the network infrastructure in response to one or more metrics indicating that the peer-to-peer connection fails to satisfy certain conditions (e.g., performance criteria, billing criteria, etc.). In other use cases, the wireless devices may be instructed to communicate over the network infrastructure in response to receiving a lawful intercept request that identifies a subscriber with either or both wireless devices, or in the alternative, one or more keys used to encrypt the communication over the peer-to-peer connection may be transmitted to a law enforcement agency in order to enable the law enforcement agency to conduct surveillance on the communication over the peer-to-peer connection and thereby enforce the lawful intercept request.

According to another exemplary aspect, an apparatus may comprise a receiver configured to receive location information from a first wireless device and location information from a second wireless device over a network infrastructure, one or more processors configured to determine whether communication between the first wireless device and the second wireless device can be offloaded from the network infrastructure based at least in part on the location information received from the first wireless device and the location information received from the second wireless device, and a transmitter configured to transmit a message instructing the first wireless device and the second wireless device to communicate over a peer-to-peer connection that bypasses the network infrastructure in response to determining that the communication between the first wireless device and the second wireless device can be offloaded from the network infrastructure (e.g., when an estimated a distance between the first wireless device and the second wireless device falls within a range associated with one or more peer-to-peer technologies supported on the first wireless device and/or the second wireless device).

According to another exemplary aspect, an apparatus may comprise means for receiving location information from a first wireless device and location information from a second wireless device over a network infrastructure, means for determining whether communication between the first wireless device and the second wireless device can be offloaded from the network infrastructure based at least in part on the location information received from the first wireless device and the location information received from the second wireless device, and means for instructing the first wireless device and the second wireless device to communicate over a peer-to-peer connection that bypasses the network infrastructure in response to determining that the communication between the first wireless device and the second wireless device can be offloaded from the network infrastructure.

According to another exemplary aspect, a computer-readable storage medium may have computer-executable instructions recorded thereon, wherein executing the computer-executable instructions on a server may cause the server to receive location information from a first wireless device and location information from a second wireless device over a network infrastructure, determine whether communication between the first wireless device and the second wireless device can be offloaded from the network infrastructure based at least in part on the location information received from the first wireless device and the location information received from the second wireless device, and instruct the first wireless device and the second wireless device to communicate over a peer-to-peer connection that bypasses the network infrastructure in response to determining that the communication between the first wireless device and the second wireless device can be offloaded from the network infrastructure.

Other objects and advantages associated with the various aspects and/or embodiments disclosed herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which.

DETAILED DESCRIPTION

Figure 1:
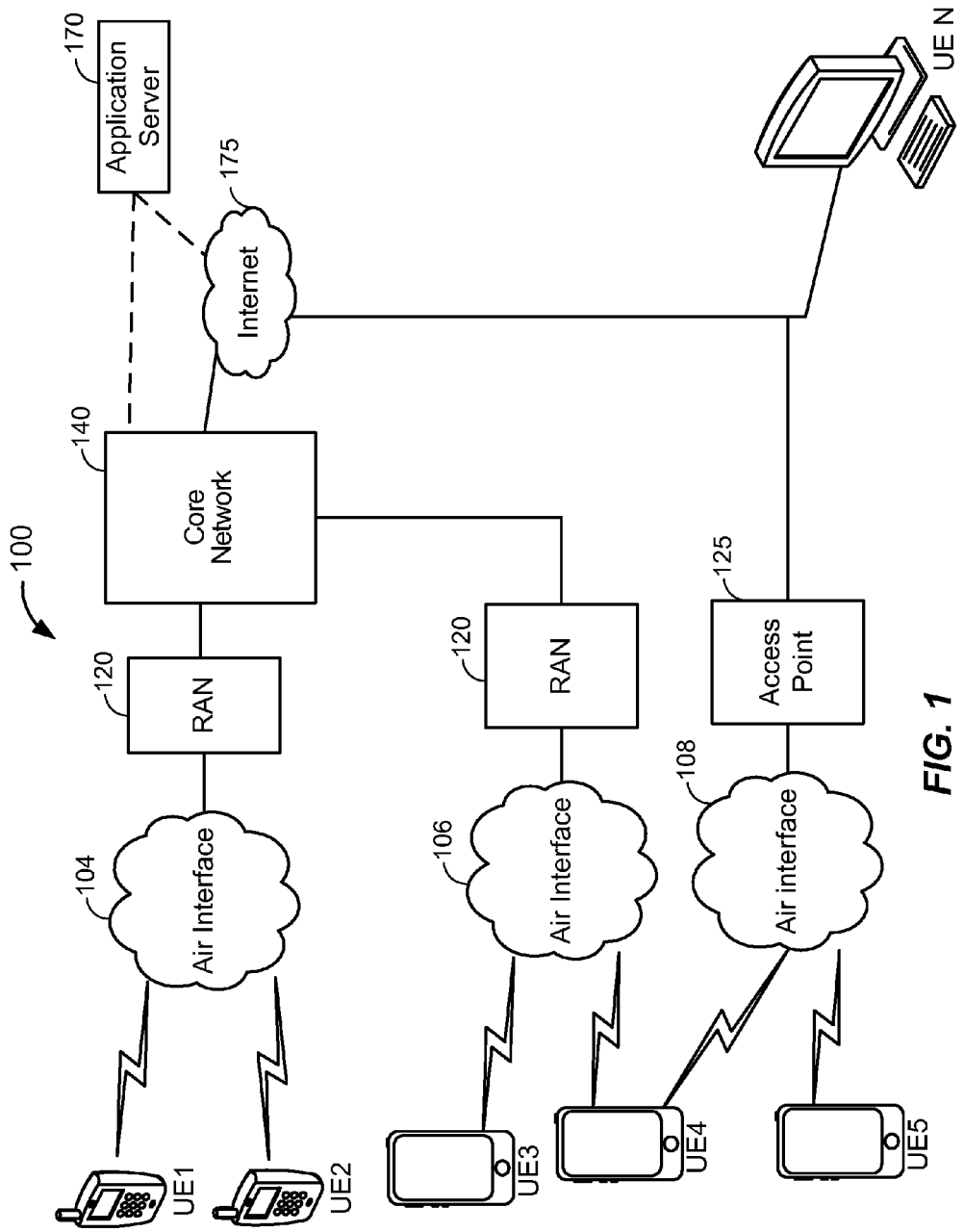
FIG. 1 illustrates a high-level system architecture of a wireless communications system, according to one aspect of the disclosure.

Various aspects are disclosed in the following description and related drawings to show specific examples relating to exemplary embodiments. Alternate embodiments will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and embodiments disclosed herein.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage or mode of operation.

The terminology used herein describes particular embodiments only and should be construed to limit any embodiments disclosed herein. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., an application specific integrated circuit (ASIC)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

A client device, referred to herein as a user equipment (UE), may be mobile or stationary, and may communicate with a radio access network (RAN). As used herein, the term "UE" may be referred to interchangeably as an "access terminal" or "AT", a "wireless device", a "subscriber device", a "subscriber terminal", a "subscriber station", a "user terminal" or UT, a "mobile terminal", a "mobile station" and variations thereof. Generally, UEs can communicate with a core network via the RAN, and through the core network the UEs can be connected with external networks such as the Internet. Of course, other mechanisms of connecting to the core network and/or the Internet are also possible for the UEs, such as over wired access networks, Wi-Fi networks (e.g., based on IEEE 802.11, etc.) and so on. UEs can be embodied by any of a number of types of devices including but not limited to PC cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse traffic channel or a downlink/forward traffic channel.

FIG. 1 illustrates a high-level system architecture of a wireless communications system 100 according to one aspect of the disclosure. The wireless communications system 100 contains UEs 1 . . . N. The UEs 1 . . . N can include cellular telephones, personal digital assistant (PDAs), pagers, a laptop computer, a desktop computer, and so on. For example, in FIG. 1, UEs 1 . . . 2 are illustrated as cellular calling phones, UEs 3 . . . 5 are illustrated as cellular touchscreen phones or smart phones, and UE N is illustrated as a desktop computer or PC.

Referring to FIG. 1, UEs 1 . . . N are configured to communicate with an access network (e.g., the RAN 120, an access point 125, etc.) over a physical communications interface or layer, shown in FIG. 1 as air interfaces 104, 106, 108 and/or a direct wired connection. The air interfaces 104 and 106 can comply with a given cellular communications protocol (e.g., CDMA, EV-DO, eHRPD, GSM, EDGE, W-CDMA, LTE, etc.), while the air interface 108 can comply with a wireless IP protocol (e.g., IEEE 802.11). The RAN 120 includes a plurality of access points that serve UEs over air interfaces, such as the air interfaces 104 and 106. The access points in the RAN 120 can be referred to as access nodes or ANs, access points or APs, base stations or BSs, Node Bs, Evolved Node Bs (eNodeBs or eNBs), and so on. These access points can be terrestrial access points (or ground stations), or satellite access points. The RAN 120 is configured to connect to a core network 140 that can perform a variety of functions, including bridging circuit switched (CS) calls between UEs served by the RAN 120 and other UEs served by the RAN 120 or a different RAN altogether, and can also mediate an exchange of packet-switched (PS) data with external networks such as Internet 175. The Internet 175 includes a number of routing agents and processing agents (not shown in FIG. 1 for the sake of convenience). In FIG. 1, UE N is shown as connecting to the Internet 175 directly (i.e., separate from the core network 140, such as over an Ethernet connection of Wi-Fi or 802.11-based network). The Internet 175 can thereby function to bridge packet-switched data communications between UE N and UEs 1 ... N via the core network 140. Also shown in FIG. 1 is the access point 125 that is separate from the RAN 120. The access point 125 may be connected to the Internet 175 independent of the core network 140 (e.g., via an optical communication system such as FiOS, a cable modem, etc.). The air interface 108 may serve UE 4 or UE 5 over a local wireless connection, such as IEEE 802.11 in an example. UE N is shown as a desktop computer with a wired connection to the Internet 175, such as a direct connection to a modem or router, which can correspond to the access point 125 itself in an example (e.g., a Wi-Fi router with wired and/or wireless connectivity may correspond to the access point 125).

Referring to FIG. 1, an application server 170 is shown as connected to the Internet 175, the core network 140, or both. The application server 170 can be implemented as a plurality of structurally separate servers, or alternately may correspond to a single server. As will be described below in more detail, the application server 170 is configured to support one or more communication services for UEs that can connect to the application server 170 via the core network 140 and/or the Internet 175 (e.g., Voice-over-Internet Protocol (VoIP) sessions, Voice-over-LTE (VoLTE) sessions, Push-to-Talk (PTT) sessions, group communication sessions, sessions that involve Rich Communication Services (RCS) sessions, social networking services, etc.).

Examples of protocol-specific implementations for the RAN 120 and the core network 140 are provided below with respect to FIGS. 2A through 2D to help explain the wireless communications system 100 in more detail. In particular, the components of the RAN 120 and the core network 140 corresponds to components associated with supporting packet-switched (PS) communications, whereby legacy circuit-switched (CS) components may also be present in these networks, but any legacy CS-specific components are not shown explicitly in FIGS. 2A-2D.

Figure 2A:
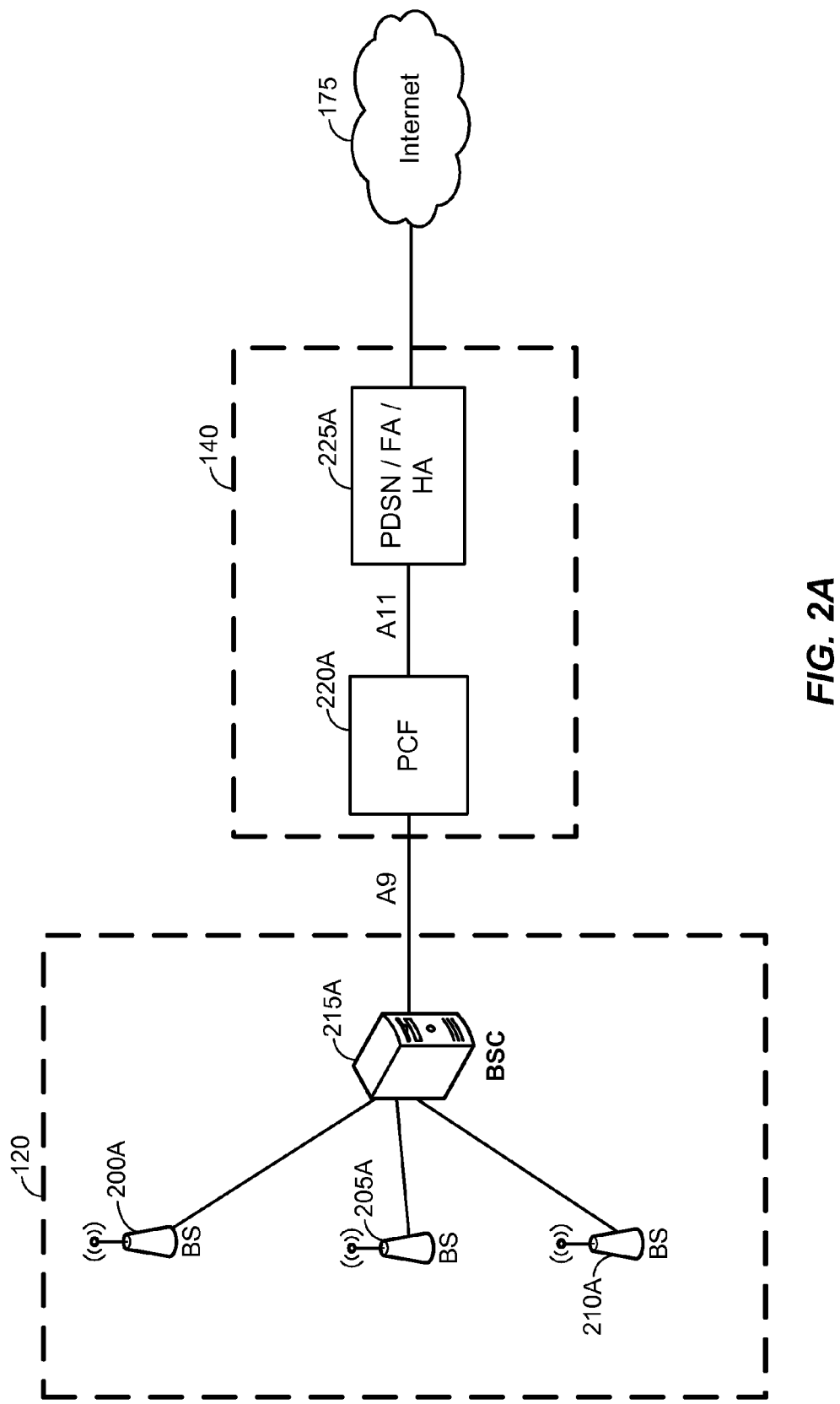
FIG. 2A illustrates an example configuration of a radio access network (RAN) and a packet-switched portion of a core network for a 1×EV-DO network, according to one aspect of the disclosure.

FIG. 2A illustrates an example configuration of the RAN 120 and the core network 140 for packet-switched communications in a CDMA2000 1x Evolution-Data Optimized (EV-DO) network according to one aspect of the disclosure. Referring to FIG. 2A, the RAN 120 includes a plurality of base stations (BSs) 200A, 205A and 210A that are coupled to a base station controller (BSC) 215A over a wired backhaul interface. A group of BSs controlled by a single BSC is collectively referred to as a subnet. As will be appreciated by one of ordinary skill in the art, the RAN 120 can include multiple BSCs and subnets, and a single BSC is shown in FIG. 2A for the sake of convenience. The BSC 215A communicates with a packet control function (PCF) 220A within the core network 140 over an A9 connection. The PCF 220A performs certain processing functions for the BSC 215A related to packet data. The PCF 220A communicates with a Packet Data Serving Node (PDSN) 225A within the core network 140 over an A11 connection. The PDSN 225A has a variety of functions, including managing Point-to-Point (PPP) sessions, acting as a home agent (HA) and/or foreign agent (FA), and is similar in function to a Gateway General Packet Radio Service (GPRS) Support Node (GGSN) in GSM and UMTS networks (described below in more detail). The PDSN 225A connects the core network 140 to external IP networks, such as the Internet 175.

Figure 2B:
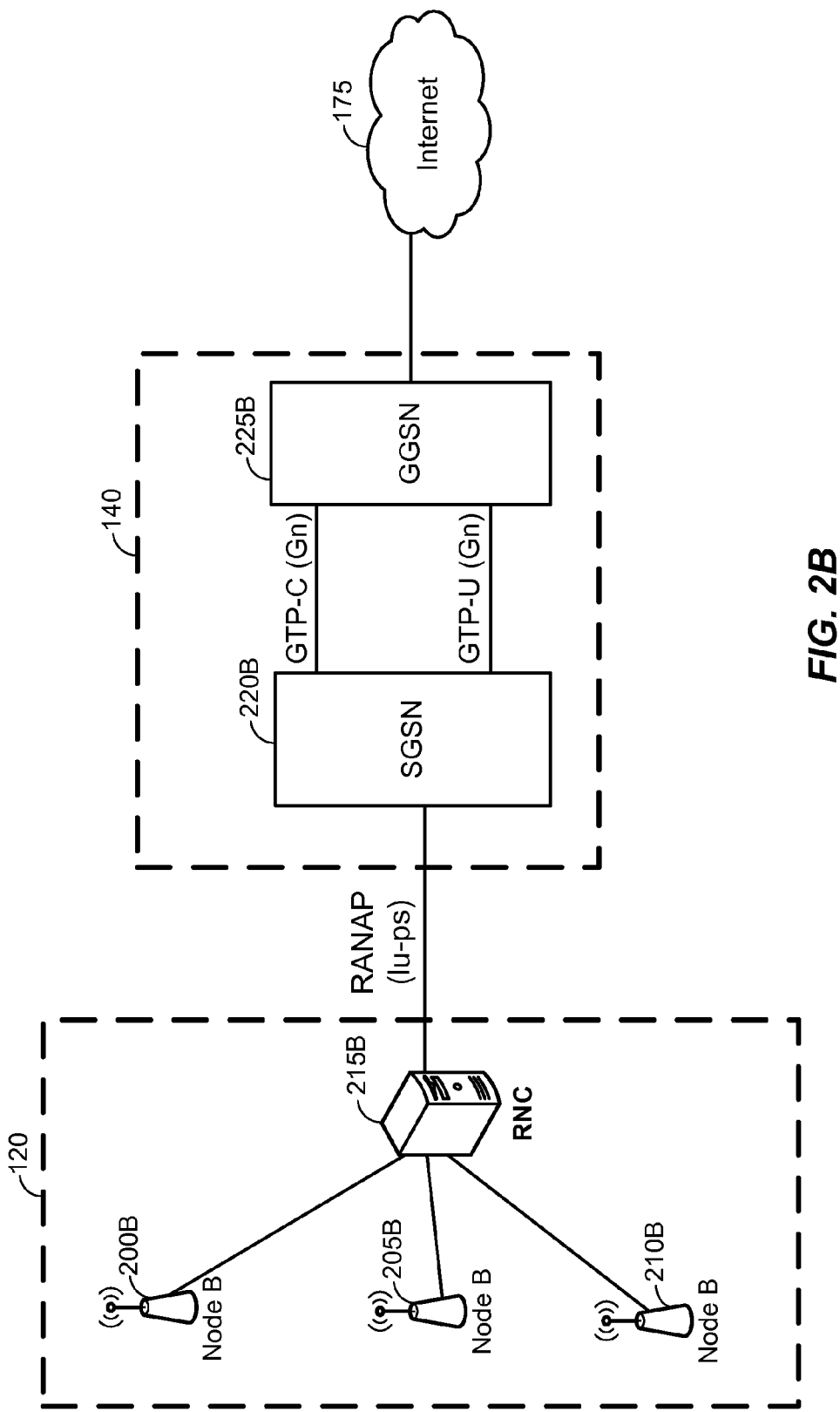
FIG. 2B illustrates an example configuration of the RAN and a packet-switched portion of a General Packet Radio Service (GPRS) core network within a 3G UMTS W-CDMA system, according to one aspect of the disclosure.

FIG. 2B illustrates an example configuration of the RAN 120 and a packet-switched portion of the core network 140 that is configured as a GPRS core network within a 3G UMTS W-CDMA system according to one aspect of the disclosure.

Referring to FIG. 2B, the RAN 120 includes a plurality of Node Bs 200B, 205B and 210B that are coupled to a Radio Network Controller (RNC) 215B over a wired backhaul interface. Similar to 1xEV-DO networks, a group of Node Bs controlled by a single RNC is collectively referred to as a subnet. As will be appreciated by one of ordinary skill in the art, the RAN 120 can include multiple RNCs and subnets, and a single RNC is shown in FIG. 2B for the sake of convenience. The RNC 215B is responsible for signaling, establishing and tearing down bearer channels (i.e., data channels) between a Serving GRPS Support Node (SGSN) 220B in the core network 140 and UEs served by the RAN 120. If link layer encryption is enabled, the RNC 215B also encrypts the content before forwarding it to the RAN 120 for transmission over an air interface. The function of the RNC 215B is well-known in the art and will not be discussed further for the sake of brevity.

In FIG. 2B, the core network 140 includes the above-noted SGSN 220B (and potentially a number of other SGSNs as well) and a GGSN 225B. Generally, GPRS is a protocol used in GSM for routing IP packets. The GPRS core network (e.g., the GGSN 225B and one or more SGSNs 220B) is the centralized part of the GPRS system and also provides support for W-CDMA based 3G access networks. The GPRS core network is an integrated part of the GSM core network (i.e., the core network 140) that provides mobility management, session management, and transport for IP packet services in GSM and W-CDMA networks.

The GPRS Tunneling Protocol (GTP) is the defining IP protocol of the GPRS core network. The GTP is the protocol which allows end users (e.g., UEs) of a GSM or W-CDMA network to move from place to place while continuing to connect to the Internet 175 as if from one location at the GGSN 225B. This is achieved by transferring the respective UE's data from the UE's current SGSN 220B to the GGSN 225B, which is handling the respective UE's session.

Three forms of GTP are used by the GPRS core network; namely, (i) GTP-U, (ii) GTP-C and (iii) GTP' (GTP Prime). GTP-U is used for transfer of user data in separated tunnels for each packet data protocol (PDP) context. GTP-C is used for control signaling (e.g., setup and deletion of PDP contexts, verification of GSN reach-ability, updates or modifications such as when a subscriber moves from one SGSN to another, etc.). GTP' is used for transfer of charging data from GSNs to a charging function.

Referring to FIG. 2B, the GGSN 225B acts as an interface between a GPRS backbone network (not shown) and the Internet 175. The GGSN 225B extracts packet data with associated a packet data protocol (PDP) format (e.g., IP or PPP) from GPRS packets coming from the SGSN 220B, and sends the packets out on a corresponding packet data network. In the other direction, the incoming data packets are directed by the GGSN connected UE to the SGSN 220B which manages and controls the Radio Access Bearer (RAB) of a target UE served by the RAN 120. Thereby, the GGSN 225B stores the current SGSN address of the target UE and its associated profile in a location register (e.g., within a PDP context). The GGSN 225B is responsible for IP address assignment and is the default router for a connected UE. The GGSN 225B also performs authentication and charging functions.

The SGSN 220B is representative of one of many SGSNs within the core network 140, in an example. Each SGSN is responsible for the delivery of data packets from and to the UEs within an associated geographical service area. The tasks of the SGSN 220B includes packet routing and transfer, mobility management (e.g., attach/detach and location management), logical link management, and authentication and charging functions. The location register of the SGSN 220B stores location information (e.g., current cell, current VLR) and user profiles (e.g., IMSI, PDP address(es) used in the packet data network) of all GPRS users registered with the SGSN 220B, for example, within one or more PDP contexts for each user or UE. Thus, SGSNs 220B are responsible for (i) de-tunneling downlink GTP packets from the GGSN 225B, (ii) uplink tunnel IP packets toward the GGSN 225B, (iii) carrying out mobility management as UEs move between SGSN service areas and (iv) billing mobile subscribers. As will be appreciated by one of ordinary skill in the art, aside from (i)-(iv), SGSNs configured for GSM/EDGE networks have slightly different functionality as compared to SGSNs configured for W-CDMA networks.

The RAN 120 (e.g., or UTRAN, in UMTS system architecture) communicates with the SGSN 220B via a Radio Access Network Application Part (RANAP) protocol. RANAP operates over an Iu interface (Iu-ps), with a transmission protocol such as Frame Relay or IP. The SGSN 220B communicates with the GGSN 225B via a Gn interface, which is an IP-based interface between SGSN 220B and other SGSNs (not shown) and internal GGSNs (not shown), and uses the GTP protocol defined above (e.g., GTP-U, GTP-C, GTP', etc.). In the embodiment of FIG. 2B, the Gn between the SGSN 220B and the GGSN 225B carries both the GTP-C and the GTP-U. While not shown in FIG. 2B, the Gn interface is also used by the Domain Name System (DNS). The GGSN 225B is connected to a Public Data Network (PDN) (not shown), and in turn to the Internet 175, via a Gi interface with IP protocols either directly or through a Wireless Application Protocol (WAP) gateway.

Figure 2C:
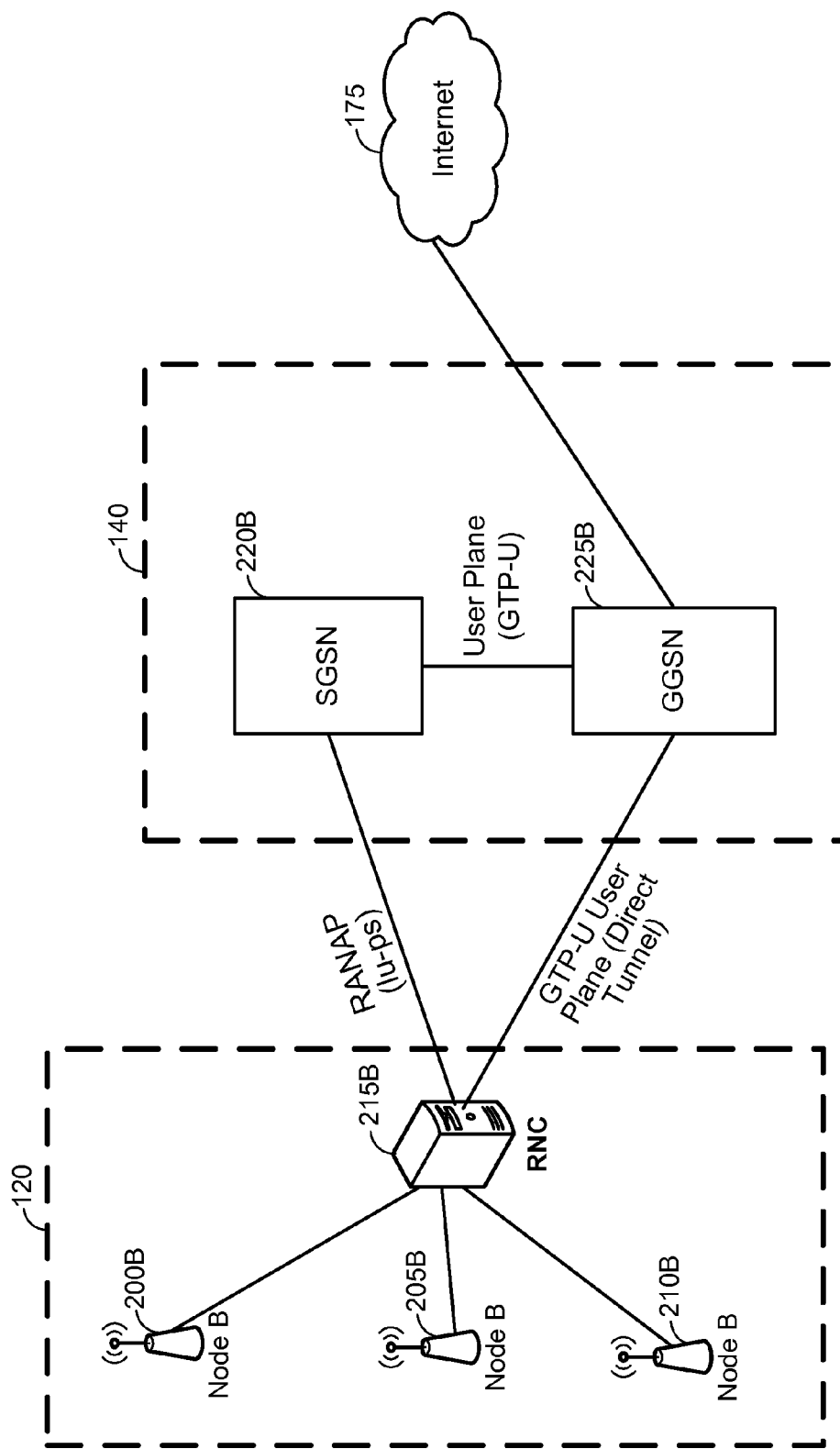
FIG. 2C illustrates another example configuration of the RAN and a packet-switched portion of a GPRS core network within a 3G UMTS W-CDMA system, according to one aspect of the disclosure.

FIG. 2C illustrates another example configuration of the RAN 120 and a packet-switched portion of the core network 140 that is configured as a GPRS core network within a 3G UMTS W-CDMA system according to one aspect of the disclosure. Similar to FIG. 2B, the core network 140 includes the SGSN 220B and the GGSN 225B. However, in FIG. 2C, Direct Tunnel is an optional function in Iu mode that allows the SGSN 220B to establish a direct user plane tunnel, GTP-U, between the RAN 120 and the GGSN 225B within a PS domain. A Direct Tunnel capable SGSN, such as SGSN 220B in FIG. 2C, can be configured on a per GGSN and per RNC basis whether or not the SGSN 220B can use a direct user plane connection. The SGSN 220B in FIG. 2C handles the control plane signaling and makes the decision of when to establish Direct Tunnel. When the RAB assigned for a PDP context is released (i.e. the PDP context is preserved) the GTP-U tunnel is established between the GGSN 225B and SGSN 220B in order to be able to handle the downlink packets.

Figure 2D:
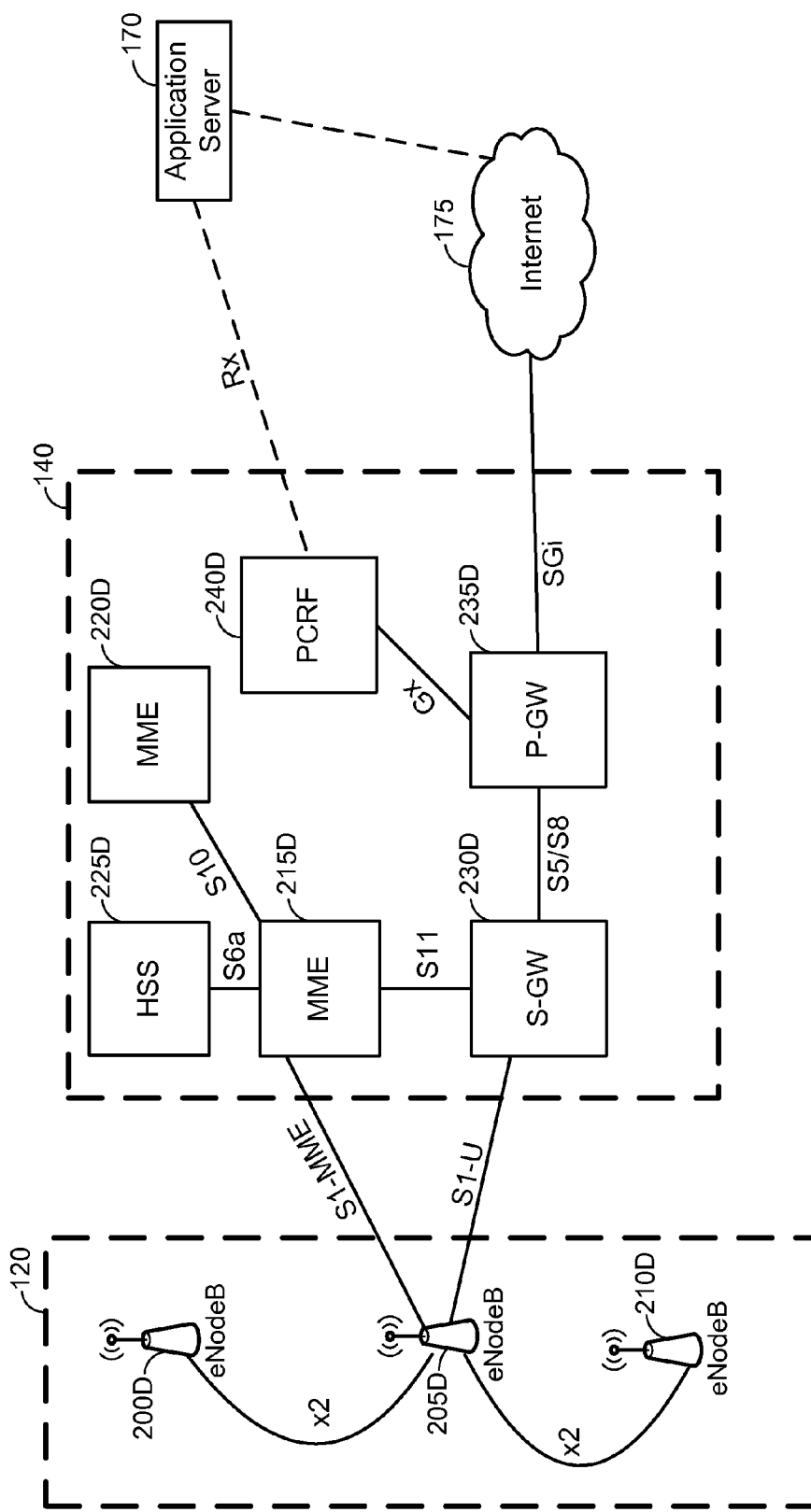
FIG. 2D illustrates an example configuration of the RAN and a packet-switched portion of the core network that is based on an Evolved Packet System (EPS) or Long Term Evolution (LTE) network, according to one aspect of the disclosure.

FIG. 2D illustrates an example configuration of the RAN 120 and a packet-switched portion of the core network 140 based on an Evolved Packet System (EPS) or LTE network, according to one aspect of the disclosure. Referring to FIG. 2D, unlike the RAN 120 shown in FIGS. 2B-2C, the RAN 120 in the EPS/LTE network is configured with a plurality of eNodeBs 200D, 205D and 210D, without the RNC 215B from FIGS. 2B-2C. This is because eNodeBs in EPS/LTE networks do not require a separate controller (i.e., the RNC 215B) within the RAN 120 to communicate with the core network 140. In other words, some of the functionality of the RNC 215B from FIGS. 2B-2C is built into each respective eNodeB of the RAN 120 in FIG. 2D.

In FIG. 2D, the core network 140 includes a plurality of Mobility Management Entities (MMEs) 215D and 220D, a Home Subscriber Server (HSS) 225D, a Serving Gateway (S-GW) 230D, a Packet Data Network Gateway (P-GW) 235D and a Policy and Charging Rules Function (PCRF) 240D. Network interfaces between these components, the RAN 120 and the Internet 175 are illustrated in FIG. 2D and are defined in Table 1 (below) as follows:

TABLE 1

| Network Interface | Description |
|---|---|
| EPS/LTE Core Network Connection Definitions | |
| S1-MME | Reference point for the control plane protocol between RAN 120 and MME 215D. |
| S1-U | Reference point between RAN 120 and S-GW 230D for the per bearer user plane tunneling and inter-eNodeB path switching during handover. |
| S5 | Provides user plane tunneling and tunnel management between S-GW 230D and P-GW 235D. It is used for S-GW relocation due to UE mobility and if the S-GW 230D needs to connect to a non-collocated P-GW for the required PDN connectivity. |
| S6a | Enables transfer of subscription and authentication data for authenticating/authorizing user access to the evolved system (Authentication, Authorization, and Accounting [AAA] interface) between MME 215D and HSS 225D. |
| Gx | Provides transfer of Quality of Service (QoS) policy and charging rules from PCRF 240D to Policy a Charging Enforcement Function (PCEF) component (not shown) in the P-GW 235D. |
| S8 | Inter-PLMN reference point providing user and control plane between the S-GW 230D in a Visited Public Land Mobile Network (VPLMN) and the P-GW 235D in a Home Public Land Mobile Network (HPLMN). S8 is the inter-PLMN variant of S5. |
| S10 | Reference point between MMEs 215D and 220D for MME relocation and MME to MME information transfer. |
| S11 | Reference point between MME 215D and S-GW 230D. |
| SGi | Reference point between the P-GW 235D and the packet data network, shown in FIG. 2D as the Internet 175. The Packet data network may be an operator external public or private packet data |

TABLE 1-continued

EPS/LTE Core Network Connection Definitions

| Network Interface | Description |
| --- | --- |
| | network or an intra-operator packet data network (e.g., for provision of IMS services). This reference point corresponds to Gi for 3GPP accesses. |
| X2 | Reference point between two different eNodeBs used for UE handoffs. |
| Rx | Reference point between the PCRF 240D and an application function (AF) that is used to exchanged application-level session information, where the AF is represented in FIG. 1 by the application server 170. |

A high-level description of the components shown in the RAN 120 and core network 140 of FIG. 2D will now be described. However, these components are each well-known in the art from various 3GPP TS standards, and the description contained herein is not intended to be an exhaustive description of all functionalities performed by these components.

Referring to FIG. 2D, the MMEs 215D and 220D are configured to manage the control plane signaling for the EPS bearers. MME functions include: Non-Access Stratum (NAS) signaling, NAS signaling security, Mobility management for inter- and intra-technology handovers, P-GW and S-GW selection, and MME selection for handovers with MME change.

Referring to FIG. 2D, the S-GW 230D is the gateway that terminates the interface toward the RAN 120. For each UE associated with the core network 140 for an EPS-based system, at a given point of time, there is a single S-GW. The functions of the S-GW 230D, for both the GTP-based and the Proxy Mobile IPv6 (PMIP)-based S5/S8, include: Mobility anchor point, Packet routing and forwarding, and setting the DiffSery Code Point (DSCP) based on a QoS Class Identifier (QCI) of the associated EPS bearer.

Referring to FIG. 2D, the P-GW 235D is the gateway that terminates the SGi interface toward the Packet Data Network (PDN), e.g., the Internet 175. If a UE is accessing multiple PDNs, there may be more than one P-GW for that UE; however, a mix of S5/S8 connectivity and Gn/Gp connectivity is not typically supported for that UE simultaneously. P-GW functions include for both the GTP-based S5/S8: Packet filtering (by deep packet inspection), UE IP address allocation, setting the DSCP based on the QCI of the associated EPS bearer, accounting for inter operator charging, uplink (UL) and downlink (DL) bearer binding as defined in 3GPP TS 23.203, UL bearer binding verification as defined in 3GPP TS 23.203. The P-GW 235D provides PDN connectivity to both GSM/EDGE Radio Access Network (GERAN)/UTRAN only UEs and E-UTRAN-capable UEs using any of E-UTRAN, GERAN, or UTRAN. The P-GW 235D provides PDN connectivity to E-UTRAN capable UEs using E-UTRAN only over the S5/S8 interface.

Referring to FIG. 2D, the PCRF 240D is the policy and charging control element of the EPS-based core network 140. In a non-roaming scenario, there is a single PCRF in the HPLMN associated with a UE's Internet Protocol Connectivity Access Network (IP-CAN) session. The PCRF terminates the Rx interface and the Gx interface. In a roaming scenario with local breakout of traffic, there may be two PCRFs associated with a UE's IP-CAN session: A Home PCRF (H-PCRF) is a PCRF that resides within a HPLMN, and a Visited PCRF (V-PCRF) is a PCRF that resides within a visited VPLMN. PCRF is described in more detail in 3GPP TS 23.203, and as such will not be described further for the sake of brevity. In FIG. 2D, the application server 170 (e.g., which can be referred to as the AF in 3GPP terminology) is shown as connected to the core network 140 via the Internet 175, or alternatively to the PCRF 240D directly via an Rx interface. Generally, the application server 170 (or AF) is an element offering applications that use IP bearer resources with the core network (e.g. UMTS PS domain/GPRS domain resources/LTE PS data services). One example of an application function is the Proxy-Call Session Control Function (P-CSCF) of the IP Multimedia Subsystem (IMS) Core Network subsystem. The AF uses the Rx reference point to provide session information to the PCRF 240D. Any other application server offering IP data services over cellular network can also be connected to the PCRF 240D via the Rx reference point.

Figure 2E:
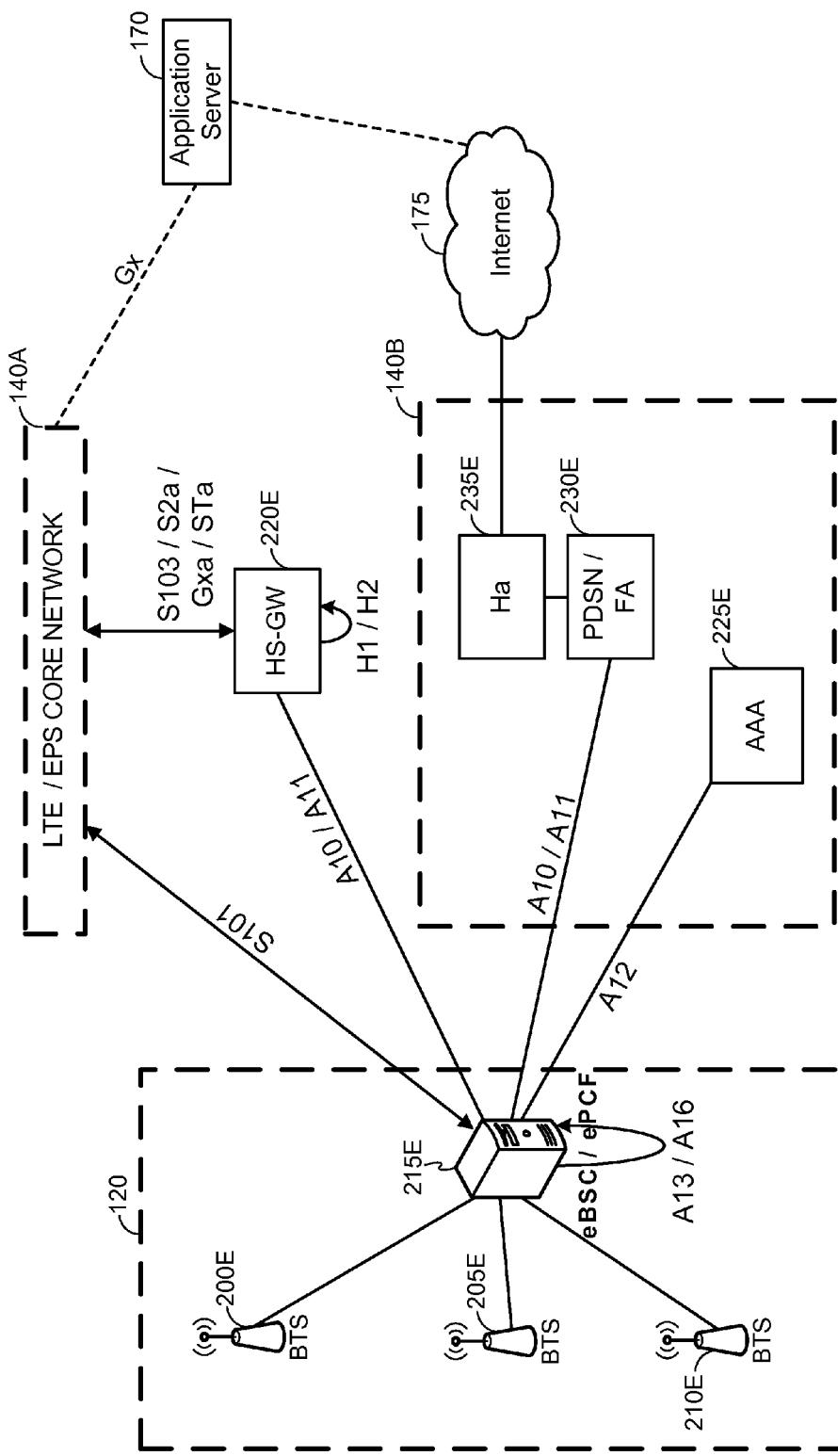
FIG. 2E illustrates an example configuration of an enhanced High Rate Packet Data (HRPD) RAN connected to an EPS or LTE network and also a packet-switched portion of an HRPD core network, according to one aspect of the disclosure.

FIG. 2E illustrates an example of the RAN 120 configured as an enhanced High Rate Packet Data (HRPD) RAN connected to an EPS or LTE network 140A and also a packet-switched portion of an HRPD core network 140B according to one aspect of the disclosure. The core network 140A is an EPS or LTE core network, similar to the core network described above with respect to FIG. 2D.

In FIG. 2E, the eHRPD RAN includes a plurality of base transceiver stations (BTSs) 200E, 205E and 210E, which are connected to an enhanced BSC (eBSC) and enhanced PCF (ePCF) 215E. The eBSC/ePCF 215E can connect to one of the MMEs 215D or 220D within the EPS core network 140A over an S101 interface, and to an HRPD serving gateway (HSGW) 220E over A10 and/or A11 interfaces for interfacing with other entities in the EPS core network 140A (e.g., the S-GW 220D over an S103 interface, the P-GW 235D over an S2a interface, the PCRF 240D over a Gxa interface, a 3GPP AAA server (not shown explicitly in FIG. 2D) over an STa interface, etc.). The HSGW 220E is defined in 3GPP2 to provide the interworking between HRPD networks and EPS/LTE networks. As will be appreciated, the eHRPD RAN and the HSGW 220E are configured with interface functionality to EPC/LTE networks that is not available in legacy HRPD networks.

Turning back to the eHRPD RAN, in addition to interfacing with the EPS/LTE network 140A, the eHRPD RAN can also interface with legacy HRPD networks such as HRPD network 140B. As will be appreciated the HRPD network 140B is an example implementation of a legacy HRPD network, such as the EV-DO network from FIG. 2A. For example, the eBSC/ePCF 215E can interface with an authentication, authorization and accounting (AAA) server 225E via an A12 interface, or to a PDSN/FA 230E via an A10 or A11 interface. The PDSN/FA 230E in turn connects to HA 235A, through which the Internet 175 can be accessed. In FIG. 2E, certain interfaces (e.g., A13, A16, H1, H2, etc.) are not described explicitly but are shown for completeness and would be understood by one of ordinary skill in the art familiar with HRPD or eHRPD.

Referring to FIGS. 2B-2E, it will be appreciated that LTE core networks (e.g., FIG. 2D) and HRPD core networks that interface with eHRPD RANs and HSGWs (e.g., FIG. 2E) can support network-initiated Quality of Service (QoS) (e.g., by the P-GW, GGSN, SGSN, etc.) in certain cases.

Figure 3A:
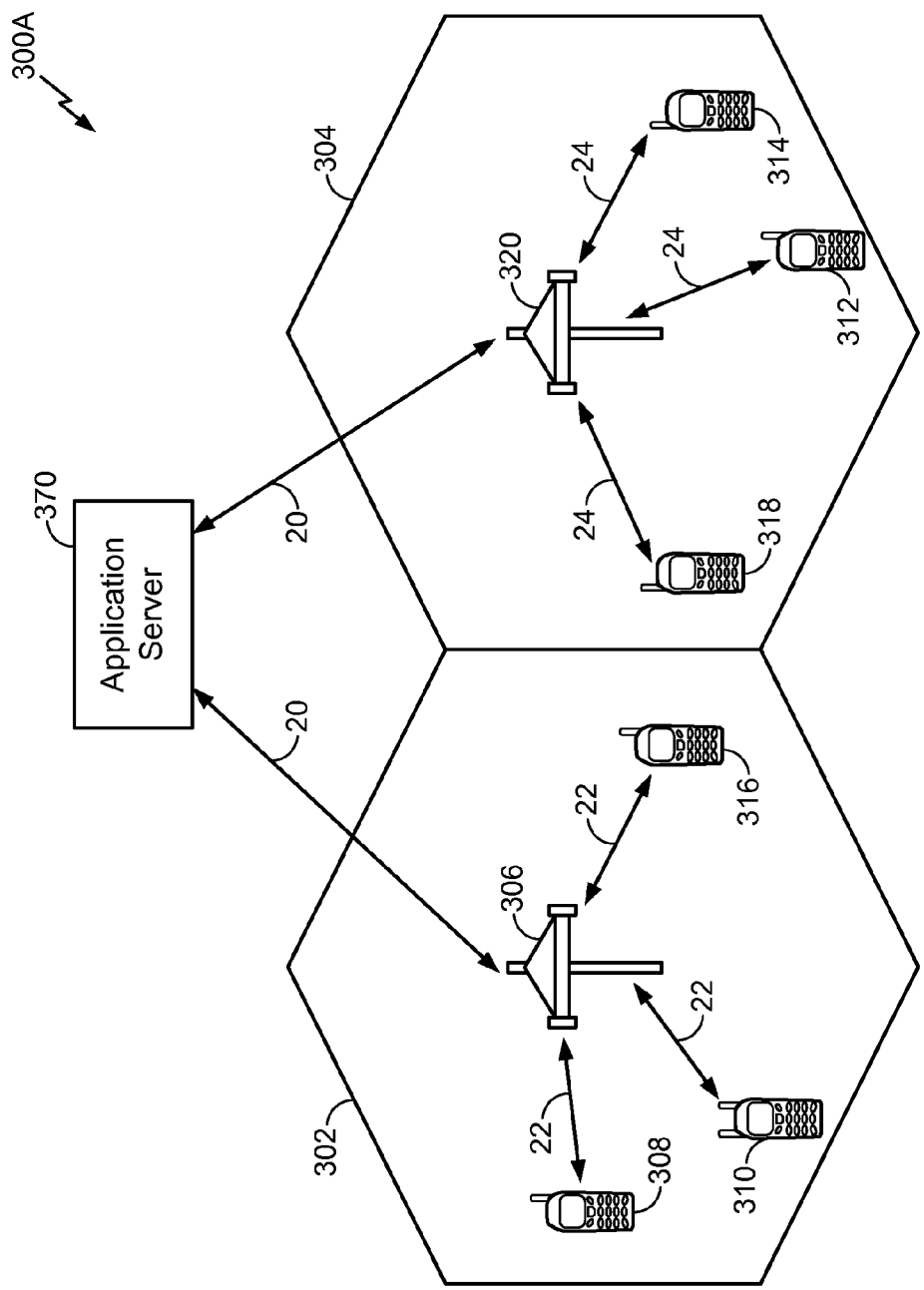
FIGS. 3A-3B illustrate exemplary wireless communications systems where a server may mediate offloading communication between endpoints from a network infrastructure to a peer-to-peer (P2P) connection, according to one aspect of the disclosure.
Figure 3B:
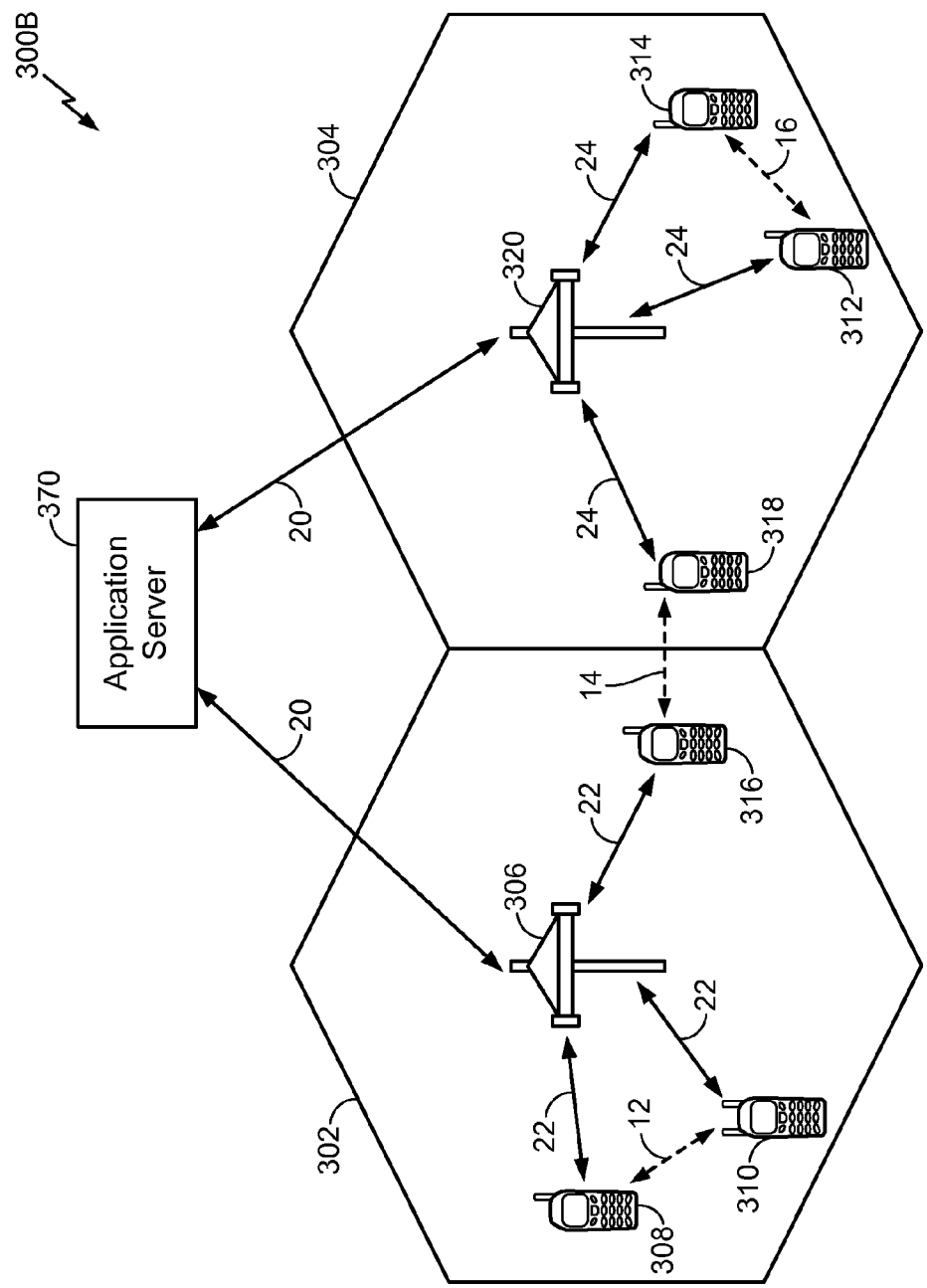

According to one aspect of the disclosure, FIG. 3A and FIG. 3B illustrate exemplary wireless communications systems 300A and 300B where an application server 370 (e.g., the application server 170 in FIG. 1, FIG. 2D, FIG. 2E, etc.) may mediate offloading communication between endpoints from a network infrastructure to a peer-to-peer (P2P) connection. More particularly, referring to FIG. 3A, the wireless communications system 300A shown therein includes a first cell 302 having a first base station 306, a second cell 304 having a second base station 320, and the application server 370 coupled to the first base stations 306 and the second base station 320 via a network link 20. The coverage area of a given base station is represented by the cell in which the given base station is located, whereby for purposes of discussion, the first cell 302 includes the coverage area corresponding to the first base station 306 and the second cell 304 includes the coverage area corresponding to the second base station 320. Each the cells 302, 304 in the wireless communications system 300A include various UEs that communicate with the respective base stations 306, 320 and with the application server 370 via the respective base stations 306, 320. For example, in the embodiment illustrated in FIG. 3A, the first cell 302 includes UE 308, UE 310, and UE 316, while the second cell 304 includes UE 312, UE 314, and UE 318, wherein one or more of the UEs in the wireless communications system 300A may be mobile or other wireless devices. Although not shown in FIG. 3A, in some embodiments the base stations 306, 320 may be connected to one another via a backhaul link.

In accordance with various exemplary embodiments described herein, one or more of UE 308, UE 310, UE 316, UE 312, UE 314, and UE 318 may support direct P2P communications, whereby such UEs may support communicating with one another directly without having to communicate through another device or a network infrastructure element such as the first base station 306 and the second base station 320 and also support communications through the network infrastructure elements such as the first base station 306 and/or the second base station 320. In communications that involve network infrastructure, signals may generally be transmitted and received through uplink and downlink connections between various UEs and the base stations 306, 320, such as link 22 in the first cell 302 and link 24 in the second cell 304. Each of the base stations 306, 320 generally serve as the attachment point for the UEs in the corresponding cells 302, 304 and facilitate communications between the UEs served therein. In accordance with one aspect, when two or more UEs, such as UE 308 and UE 310, wish to communicate with one another and are located in sufficient proximity to each other, then a direct P2P link can be established therebetween, which may offload traffic from the base station 306 serving the UEs 308, 310, allow UEs 308, 310 to communicate more efficiently, or provide other advantages that will be apparent to those skilled in the art.

Accordingly, in one embodiment, the application server 370 may generally determine whether communication between the UEs 308, 310 seeking to communicate can be offloaded from the network infrastructure to a P2P connection, in which case the application server 370 may instruct the UEs 308, 310 to communicate via the P2P connection, as shown by link 12 in FIG. 3B. Similarly, as shown in FIG. 3A, the UE 312 can communicate with UE 314 through intermediate base station 320 via link 24, or as shown in FIG. 3B, UE 312 and UE 314 may further communicate via a P2P link 16. Furthermore, for inter-cell communications where the participating UEs are in different nearby cells, a direct P2P communications link is still a possibility, which is illustrated in FIG. 3B where UE 316 and UE 318 may communicate using direct P2P communications illustrated by dashed link 14.

In various embodiments, the application server 370 may mediate whether to offload communications between two or more UEs in the wireless communications system 300A to a direct P2P link as in FIG. 3B and/or have the two or more UEs communicate through an infrastructure element such as base stations 306, 320. In particular, the application server 370 may direct two or more UEs seeking to communicate to turn on P2P interfaces based on coarse or precise location information associated with the UEs, a prediction or inference that the two or more UEs intend to communicate, resource status associated with the UEs, operator and/or user preferences, and/or other suitable criteria. In one embodiment, in response to the application server 370 determining that communications between two or more UEs can be offloaded to a direct P2P link, the application server 370 can coordinate having the UEs turn on P2P interfaces and instruct the UEs to use the P2P interfaces to transfer data or otherwise communicate. The application server 370 may then maintain connectivity with the UEs communicating via the P2P connection in parallel, periodically check the status associated with the P2P communication session, and direct the UEs to move the communication to a 3G/4G cellular network or other network infrastructure if needed (e.g., in response to receiving a lawful intercept request, in response to the P2P signal between the UEs degrading, etc.). Furthermore, the P2P offloading concept can be extended to group calls, wherein the application server 370 may mediate multi-hop communication among various UEs communicating over P2P connections. For example, as shown in FIG. 3B, UEs 308, 310, 312, and 314 may be participating in a group call, wherein the application server 370 may relay communication involving UEs 308, 310 that are communicating P2P via link 12 to UEs 312, 314 over the network infrastructure and similarly relay communication involving UEs 312, 314 that are communicating P2P via link 16 to UEs 308, 310 over the network infrastructure, while communications between UEs 308, 310 and communications between UEs 312, 314 may be offloaded from the network infrastructure.

In one embodiment, as noted above, the application server 370 may determine whether to offload communication between two or more UEs seeking to communicate from the network infrastructure based on various criteria. In one example, the application server 370 may receive dynamic, periodic, or event-triggered location reports from the various UEs using the wireless communications systems 300A, 300B, whereby the application server 370 may know coarse or precise locations associated with the various UEs. As such, when a particular UE (e.g., UE 308) seeks to initiate a call or another suitable communication session with another UE (e.g., UE 310), the caller UE 308 may transmit a call request that includes current P2P status information associated therewith to the application server 370, wherein the current P2P status information provided in the call request may include a P2P identifier, coarse or precise location information, status information indicating whether P2P power saving features, P2P discovery features, and/or P2P interfaces are on or off, and/or other suitable information that may be relevant to P2P communication. Furthermore, as used herein, the call request (which may be alternatively and/or interchangeably referred to as a "call origination message") may generally refer to any suitable signaling that an originating client (e.g., the caller UE 308) may transmit to the application server 370 to initiate an intended communication with another client (e.g., the called UE 310). For example, the call request may be used to initiate a traditional voice call, to initiate a media transfer, to initiate a media exchange session, or to initiate any other suitable type of media exchange, as will be apparent to those skilled in the art (e.g., for IMS, the call request may comprise a SIP INVITE message). In any case, in response to receiving the call request from the caller UE 308, the application server 370 may check the last known P2P status from the called UE 310 and assess whether P2P offloading is possible if the last known P2P status was received within a certain time interval or alternatively query the called UE 310 to request an updated P2P status from the called UE 310 if the last known P2P status received therefrom was not received within the time interval (e.g., was received before a predetermined time and is therefore considered stale). In another example, the application server 370 may infer that UE 308 intends to communicate with UE 310 based on information in periodic or event-triggered reports that the UEs 308, 310 provide to the application server 370, which may indicate that the UE 308 is browsing a chat log with UE 310, viewing a calendar event that involves UE 310, and/or otherwise describe activity that may be conducted on the UEs 308, 310.

In one embodiment, once the application server 370 has obtained the most recent P2P status associated with the caller UE 308 and the called UE 310, the application server 370 may then determine whether P2P offloading is possible. More particularly, based on the coarse or precise location information associated with each UE, the application server 370 may determine a coarse or precise distance between the UEs, determine P2P interfaces supported on the UEs, and determine whether the UEs can suitably communicate P2P based thereon. For example, if the UEs are located within approximately ~300 meters of each other and supported P2P interfaces on each UE include LTE Direct, the UEs may be within sufficient proximity to communicate P2P using LTE Direct, which has a range of about ~500 meters. In another example, if the UEs are determined to be co-located within a building or other smaller vicinity and each supports Wi-Fi Direct, the UEs may communicate via Wi-Fi Direct. However, in contrary examples, if a first UE and a second UE are located approximately ~300 meters from one another and only one supports LTE Direct, the UEs may not be within the range necessary to communicate using LTE Direct, and in a similar respect, if one or both UEs co-located within a building do not support Wi-Fi Direct but both support LTE Direct, the UEs may communicate via LTE Direct but not via Wi-Fi Direct. Furthermore, in one embodiment, the decision about whether to prefer one P2P or another may be determined according to network operator and/or user preferences, resource status (e.g., if one UE has a low battery or a low link speed, switching P2P interfaces on may be undesirable).

In one embodiment, in response to determining that communication between two or more UEs can be suitably offloaded from the network infrastructure to a P2P connection, the application server 370 may then state which P2P interface the UEs should use (e.g., based on reported capabilities, resources, etc.), state billing criteria that will be used (e.g., based on location, the P2P interfaces that will be used, etc.), and transmit keys to the UEs that may be used to encrypt the private P2P communication associated with the offloaded session until a time-to-live (TTL) associated with the keys expires. The UEs may then turn on the appropriate P2P interfaces and start to communicate directly, bypassing the network infrastructure, and the UEs may continue to send periodic or event-triggered reports to the application server 370. Accordingly, the application server 370 may monitor the P2P communication between the UEs to determine whether to terminate the P2P offloading and/or appropriately bill the call once completed. For example, in one embodiment, the application server may terminate the P2P offloading based on performance metrics (e.g., in response to the signal quality associated with the P2P link degrading), based on billing metrics (e.g., a cost per minute constraint), in response to changes in the locations associated with the UEs (e.g., the call may be moved to network infrastructure if the UEs are moving away from each other and approaching the maximum range associated with their supported P2P interfaces), and/or in response to changes in the resource status associated with the UEs (e.g., the battery on one UE has become low and may not have enough life left to support continued P2P communication). In another example, the application server 370 may receive a lawful intercept request from appropriate authorities, in which case the application server 370 may find a local CALEA (Commission on Accreditation for Law Enforcement Agencies) proxy and specify a "catchword" to terminate the P2P offloading and move to an infrastructure hosted call. In that case, the application server 370 may provide the encryption keys given to the UEs to the CALEA proxy, which may thereby snoop on the P2P traffic as a relay node and/or via querying the UEs to provide intermittent reports on the offloaded P2P session.

Figure 4:
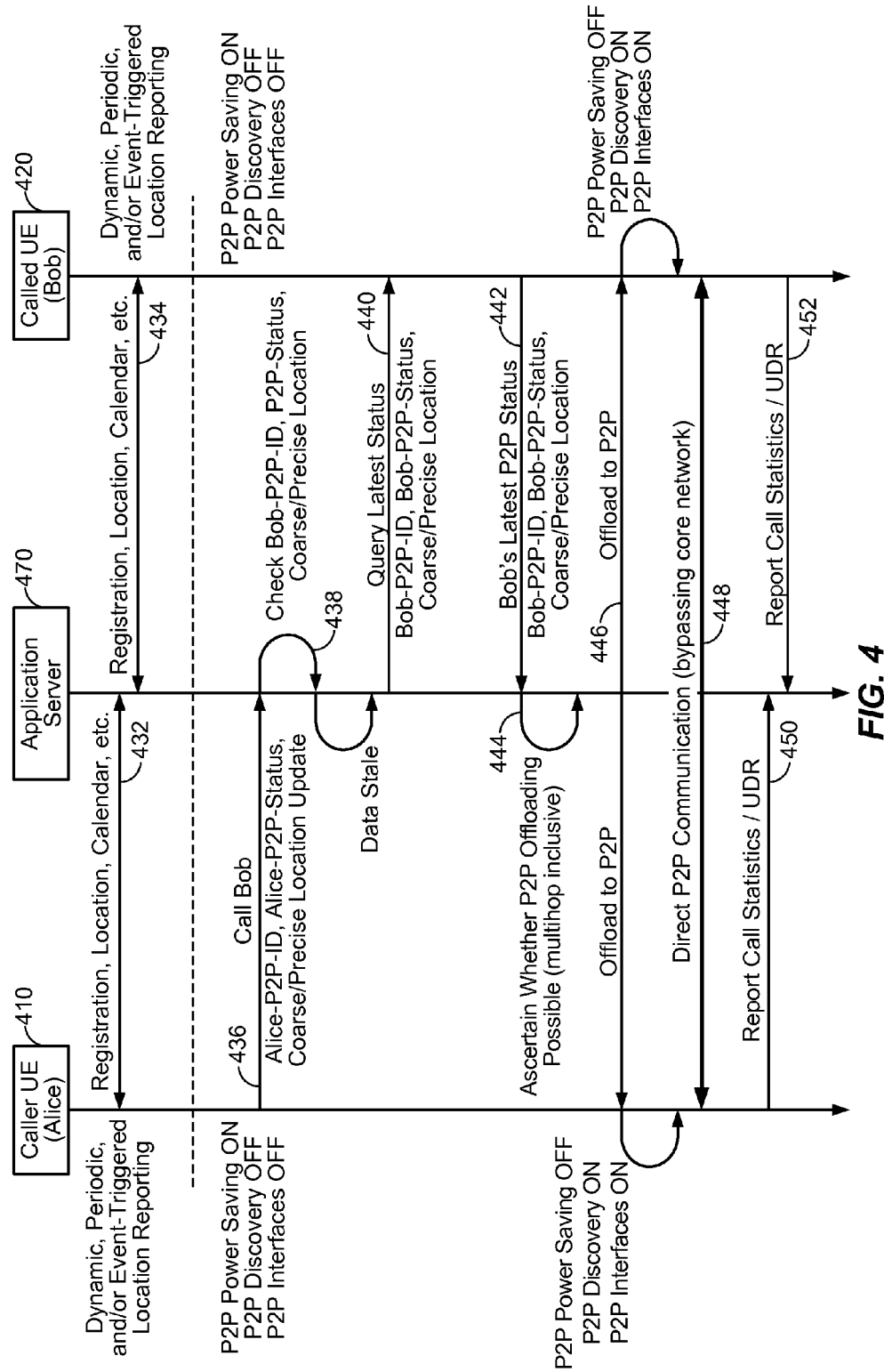
FIG. 4 illustrates an exemplary signaling flow in which a server may mediate offloading communication between endpoints from a network infrastructure to a P2P connection, according to one aspect of the disclosure.

According to one exemplary aspect, FIG. 4 illustrates an exemplary signaling flow in which an application server 470 may mediate offloading communication between two or more endpoints from a network infrastructure to a direct P2P connection. More particularly, in the exemplary signaling flow shown in FIG. 4, the application server 470 may mediate various functions to control whether a caller UE 410 and a called UE 420 should communicate over the network infrastructure or communicate with one another over a direct P2P connection, wherein the mediated functions may include authentication and authorization, media and signaling plane control, accounting control, and/or handling lawful intercept requests, among other things. Accordingly, having the application server 470 mediate whether to offload communication from the network infrastructure to direct P2P connections may allow an operator associated with the network infrastructure and end users (e.g., the caller UE 410, the called UE 420, etc.) to realize various benefits from using different P2P technologies to offload communication that involves certain services that the operator may otherwise offer over the network infrastructure (e.g., Voice-over-Internet Protocol (VoIP) sessions, Voice-over-LTE (VoLTE) sessions, Push-to-Talk (PTT) sessions, group communication sessions, sessions that involve Rich Communication Services (RCS) sessions, social networking services, etc.).

In one embodiment, the signaling flow shown in FIG. 4 may generally operate in a context where client endpoints (e.g., caller UE 410, called UE 420, etc.) report locations associated therewith to the application server 470 over the network infrastructure. For example, in one embodiment, the locations reported to the application server 470 may comprise coarse location information that estimates the location associated with the caller UE 410, the called UE 420, etc. according to a rough accuracy (e.g., within approximately 10 meters) based on Wi-Fi measurements, cellular measurements, and other data available to the client endpoints. In another example, the reported locations may comprise precise location information obtained from GPS measurements or other data sources that can estimate the location associated with the caller UE 410, the called UE 420, etc. according to a fine-grained accuracy (e.g., within a few meters or less). Accordingly, at 432 and 434, the caller UE 410 and the called UE 420 may each report a location associated therewith to the application server 470 in a dynamic, periodic, and/or event-triggered manner. For example, in one embodiment, the caller UE 410 and the called UE 420 may report the locations associated therewith to the application server 470 at periodic intervals (e.g., every few minutes), according to dynamic criteria (e.g., in response to estimating a change in the location that exceeds a threshold distance, in response to a handover from one base station to another, etc.), and/or according to event-triggered criteria (e.g., during an initial network registration procedure, browsing a location-dependent calendar entry, etc.). As such, the application server 470 may generally know coarse or precise locations associated with the caller UE 410 and the called UE 420 from the location reports received at 432 and 434, and furthermore, the location reports received at 432 and 434 may provide the application server 470 with contextual knowledge about the locations and/or communication intent associated with the caller UE 410 and the called UE 420 in certain circumstances (e.g., where an event-triggered location report indicates that the caller UE 410 was browsing a calendar entry that involves a meeting with the called UE 420 or that the caller UE 410 was browsing a chat log with the called UE 420, the application server 470 may infer that the caller UE 410 intends to communicate with the called UE 420).

In one embodiment, at 436, the application server 470 may receive a call request from the caller UE 410 at some point in time subsequent to receiving the one or more location reports at 432 and 434, wherein the call request may indicate an intent to initiate a call with Bob (i.e., the end user associated with called UE 420) and include P2P information associated with the caller UE 410. For example, the P2P information that the caller UE 410 includes in the call request received at 436 may include a P2P identifier associated therewith (e.g., a Universally Unique Identifier (UUID), a Globally Unique Identifier (GUID), etc.), P2P status information (e.g., P2P interfaces supported on the caller UE 410, operating status indicating whether P2P power saving, P2P discovery, and supported P2P interfaces, etc. are turned ON or OFF), and a coarse or precise location update associated with the caller UE 410. For example, as shown in FIG. 4, the call request transmitted at 436 may indicate that the caller UE 410 has P2P power saving turned ON, P2P discovery turned OFF, and P2P interfaces turned OFF. Furthermore, in one embodiment, the P2P information received at 436 may include resource status information associated with the caller UE 410 (e.g., available battery, processor speed, link speeds or other interface capabilities, etc.). In one embodiment, at 438, the application server 470 may then determine whether any P2P information has been received from the called UE 420, and if so, further check whether the P2P information was received within a certain time period. Accordingly, at 440, the application server 470 may query the latest P2P status from the called UE 420 in response to determining that P2P information has not been received from the called UE 420, or alternatively that the latest P2P information from the called UE 420 was not received within the time period and is therefore considered "stale." At 442, the called UE 420 may then return the latest P2P status associated therewith to the application server 470, wherein the latest P2P status associated with the called UE 420 may similarly include a P2P identifier, P2P operating status, a coarse or precise location update, and resource status information associated with the called UE 420. On the other hand, in response to determining that P2P information has been received from the called UE 420 within the time period, the application server 470 may not have any need to query the latest P2P status from the called UE 420, in which case the messages exchanged at 440 and 442 may be omitted from the signaling flow.

In either case, at 444, the application server 470 may know the latest P2P status associated with the caller UE 410 and the called UE 420 such that the application server 470 may then ascertain whether the call that was requested can be offloaded from the network infrastructure to a direct P2P connection. In particular, at 444, the application server 470 may estimate a distance between the caller UE 410 and the called UE 420 according to the most recent coarse or precise locations that were reported to the application server 470 and further determine whether the estimated distance falls within a range associated with one or more supported P2P interfaces on the caller UE 410 and the called UE 420. For example, Wi-Fi Direct generally allows device-to-device connectivity within approximately 100 meters or less, whereas LTE Direct has a range up to approximately 500 meters and Bluetooth has an approximately 10 meter range. Accordingly, the application server 470 may ascertain whether or not offloading the call to a direct P2P connection may be possible based at least on the estimated distances between the caller UE 410 and the called UE 420 and the supported P2P interfaces on the caller UE 410 and the called UE 420. For example, in a scenario where the caller UE 410 and the called UE 420 are more than approximately 100 meters apart and less than approximately 500 meters apart, P2P offloading may only be possible if the caller UE 410 and the called UE 420 each support LTE Direct. In another example, where the caller UE 410 and the called UE 420 each lack P2P interfaces that support Wi-Fi Direct and each have P2P interfaces that support LTE Direct, any P2P offloading would similarly have to employ LTE Direct (i.e., even if the caller UE 410 and the called UE 420 are less than 100 meters apart because neither supports Wi-Fi Direct). In still another example, where the caller UE 410 and the called UE 420 are approximately 50 meters apart, each have a P2P interface that supports LTE Direct, and one or the other have a P2P interface that supports Wi-Fi Direct, P2P offloading may be possible over both LTE Direct and Wi-Fi Direct because Wi-Fi Direct devices can form groups with legacy Wi-Fi devices that do not have Wi-Fi Direct support. As such, in the use cases where P2P offloading may be possible using more than one P2P technology (e.g., LTE Direct and Wi-Fi Direct), the particular P2P technology to use in the offloaded communication may be selected depending on end user preferences, device-specific preferences, operator preferences, and/or other suitable criteria (e.g., end users may prefer to use Wi-Fi Direct to communicate faster or more efficiently than may be possible with LTE Direct or avoid incurring charges against a cellular data plan, whereas an operator may prefer LTE Direct in order to collect data plan charges, while a device may configure a default preference to use LTE Direct to preserve battery life or a dynamic preference to use LTE Direct when available battery drops below a threshold because LTE Direct offers substantial power savings relative to Wi-Fi Direct, etc.).

Accordingly, in response to determining that the requested call can be offloaded from the network infrastructure to a direct P2P connection, the application server 470 may declare the appropriate parameters associated with the direct P2P connection (e.g., the selected P2P technology) and instruct the caller UE 410 and the called UE 420 to offload the call to the direct P2P connection according to the declared parameters. For example, the declared P2P parameters may include at least the P2P interface that the caller UE 410 and the called UE 420 should use to communicate over the direct connection, which may depend on the estimated distance between the caller UE 410 and the called UE 420, the P2P interfaces that are supported on the caller UE 410 and/or the called UE 420, and resource status information associated with the caller UE 410 and the called UE 420 in addition to any applicable user preferences, device-specific preferences, and/or operator preferences. Furthermore, in one embodiment, the declared P2P parameters may include billing criteria associated with the offloaded P2P call based on the locations associated with the caller UE 410 and the called UE 420 and the P2P interfaces to be used and encryption keys that can be used to protect private communication and a time-to-live (TTL) associated with the encryption keys, and/or other suitable parameters. Accordingly, at 448, the caller UE 410 and the called UE 420 may establish a direct P2P connection according to the parameters that the application server 470 declared and therefore communicate in a manner that bypasses the network infrastructure, and at 450 and 452, periodically report statistics associated with the call to the application server 470, which may maintain connectivity in parallel and periodically check whether to allow the P2P offloading to continue or terminate the P2P offloading and move to a server-hosted call over the network infrastructure (e.g., in response to the call quality failing to satisfy one or more performance metrics, the call exceeding a cost-per-minute metric or other cost constraint, the estimated distance between the caller UE 410 and the called UE 420 exceeding the maximum range associated with the P2P interfaces supported thereon, a lawful intercept request, etc.).

Figure 5:
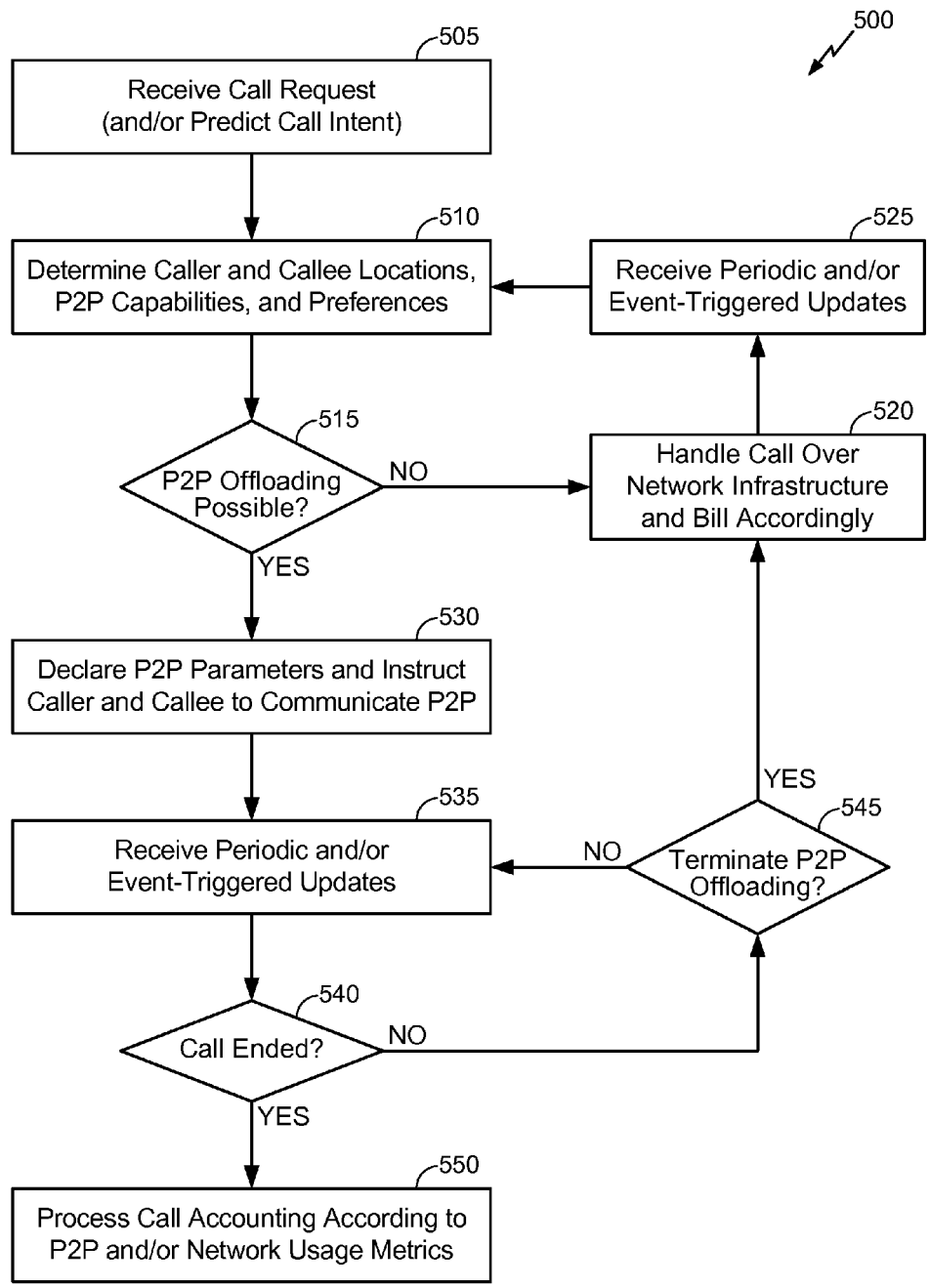
FIG. 5 illustrates an exemplary method that a server may perform to determine whether to offload communication between endpoints from a network infrastructure to a P2P connection and mediate the communication over the network infrastructure and the P2P connection, according to one aspect of the disclosure.

According to one exemplary aspect, FIG. 5 illustrates an exemplary method 500 that the application server may perform to determine whether to offload communication between endpoints from a network infrastructure to a P2P connection and mediate the communication over the network infrastructure and the P2P connection. In particular, as described in further detail above, one or more wireless devices may initially report coarse or precise locations associated therewith to the application server over a network infrastructure in a dynamic, periodic, and/or event-triggered manner, whereby the application server may generally know at least coarse or precise locations associated with the wireless devices from the received location reports. Furthermore, in one embodiment, the location reports received from the one or more wireless devices may include contextual information that may indicate a communication intent associated with the wireless devices (e.g., where an event-triggered location report indicates that a wireless device was browsing a calendar entry that involves a meeting with another wireless device). Accordingly, at block 505, the application server may receive a call request from a caller wireless device at some point in time, wherein the call request may indicate an intent to communicate with another wireless device and include P2P information associated with the caller wireless device. Alternatively, in certain circumstances, the application server may predict that the caller wireless device will originate the call with the caller wireless device at block 505 prior to and/or without receiving the call request based on the contextual information provided in the location reports received therefrom, in which case the prediction that the caller wireless device will originate the call with the caller wireless device may trigger the process in which the application server determines whether the call can be offloaded from the network infrastructure.

In one embodiment, at block 510, the application server may then determine locations, P2P capabilities, and P2P preferences associated with the caller wireless device and the called wireless device. For example, the call request received at block 505 may include a P2P identifier, the P2P capabilities, and the P2P preferences associated with the caller wireless device, in which case the location, P2P capabilities, and P2P preferences associated with the caller wireless device may be determined from the call request. Alternatively, in the circumstances where the application server predicts that the caller wireless device will originate the call with the caller wireless device prior to and/or without receiving a call request, the application server may determine whether the most recent report from the caller wireless device that included the location, P2P capabilities, and P2P preference information associated therewith was received within a certain time period, in which case the location, P2P capabilities, and P2P preferences associated with the caller wireless device may be determined from the most recent report provided from the caller wireless device. In a similar respect, the application server may determine the location, P2P capabilities, and P2P preferences associated with the called wireless device from the most recent report provided from the caller wireless device in response to determining that the most recent report was received within the defined time period. Otherwise, the application server may query the caller wireless device and/or the called wireless device at block 510 to obtain the latest P2P status from the caller wireless device and/or the called wireless device.

Accordingly, at block 515, the application server may know the latest locations, P2P capabilities, and P2P preferences associated with the caller wireless device and the called wireless device and then determine whether communication between the caller wireless device and the called wireless device can be offloaded from the network infrastructure to a direct P2P connection. In particular, at block 515, the application server may estimate the distance between the wireless devices according to the most recent coarse or precise locations reported to the application server and further determine whether the estimated distance falls within a range associated with one or more supported P2P interfaces associated with the wireless devices. As such, the application server may determine whether the wireless devices have one or more interfaces that can support P2P communication over the estimated distance between the wireless devices, and if so, the application server may further determine whether available resources and preferences permit P2P communication (e.g., based on link speeds, available battery, etc.). In response to determining that the call cannot be offloaded to a direct P2P connection (e.g., because the distance between the wireless devices exceeds the maximum range associated with the supported P2P interfaces), the application server may then handle the call over the network infrastructure and bill the call accordingly at block 520. However, the application server may continue to receive dynamic, periodic, and/or event-triggered updates from the wireless devices at block 525 and check whether the call can be subsequently offloaded to a direct P2P connection based thereon (e.g., based on whether the wireless devices move to within the maximum range associated with the supported P2P interfaces).

In one embodiment, in response to block 515 resulting in a determination that the call can be offloaded to a direct P2P connection, the application server may declare the appropriate parameters associated with the direct P2P connection and instruct the caller wireless device and the called wireless device to offload communicate over a P2P connection according to the declared parameters at block 530. For example, the declared P2P parameters may include at least the P2P interface that the caller wireless device and the called wireless device should use to communicate over the direct connection, which may depend on the estimated distance between the caller wireless device and the called wireless device, the P2P interfaces that are supported on the caller wireless device and the called wireless device, and resource status information associated with the caller wireless device and the called wireless device in addition to any applicable preferences. Furthermore, in one embodiment, the declared P2P parameters may include billing criteria associated with the offloaded P2P call, wherein the billing criteria may depend on the locations associated with the wireless devices and the P2P interfaces to be used, and the declared P2P parameters may further include encryption keys that can be used to protect the communication between the wireless devices.

Accordingly, at block 535, the application server may continue to receive dynamic, periodic, and/or event-triggered updates from the wireless devices in the manner described above, except that the updates received at block 535 may further include statistics associated with the P2P offloaded call. In one embodiment, the application server may then determine whether the P2P offloaded call has terminated at block 540, in which case the application server may process accounting associated with the call at block 550 according to the P2P statistics and/or network usage metrics (e.g., minutes that involved cellular data usage). Otherwise, in response to determining that the P2P offloaded call has not ended, the application server may determine whether to terminate the P2P offloading at block 545. For example, the application server may generally maintain connectivity with the caller and the called wireless devices in parallel and periodically check whether to allow the P2P offloading to continue or move to a server-hosted call over the network infrastructure, which may occur in response to degraded call quality, in response to the call exceeding a cost-per-minute metric, in response to the estimated distance between the caller wireless device and the called wireless device exceeding the maximum range associated with the supported P2P interfaces, in response to receiving a lawful intercept request, or based on other suitable conditions. In one embodiment, in response to determining that the P2P offloading should be offloaded, the method may return to block 520 where the application server may handle the call over the network infrastructure. Otherwise, the application server may allow the P2P offloading to continue and periodically check whether the call has ended and/or whether to move to a server-hosted call in the manner described above.

Figure 6:
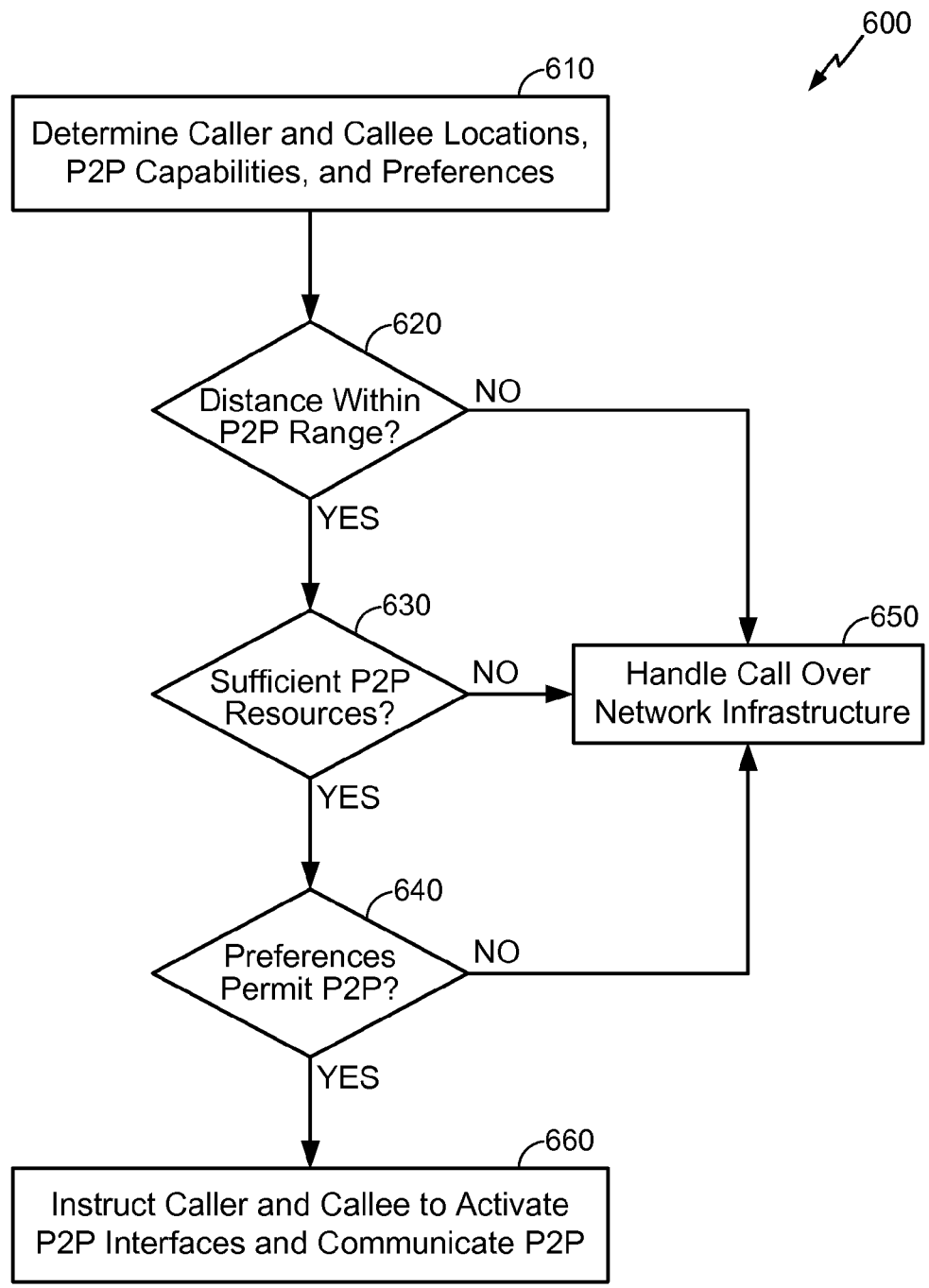
FIG. 6 illustrates an exemplary method that a server may perform to determine whether communication between endpoints can be offloaded from a network infrastructure to a P2P connection, according to one aspect of the disclosure.

According to one exemplary aspect, FIG. 6 illustrates an exemplary method 600 that the application server may perform to determine whether communication between two or more wireless devices can be offloaded from a network infrastructure to a P2P connection, wherein the method 600 shown in FIG. 6 may provide further detail relating to block 515 in FIG. 5. More particularly, in response to appropriately determining locations, P2P capabilities, and P2P preferences associated with a caller wireless device and a called wireless device at block 610, the application server may determine whether an estimated distance between the wireless devices falls within the maximum range associated with one or more P2P interfaces that the caller wireless device and the called wireless device each support. For example, if either the caller wireless device or the called wireless device support Wi-Fi Direct, the wireless devices may be within sufficient range to communicate over a direct P2P connection if the estimated distance between the wireless devices is approximately 100 meters or less because only one Wi-Fi Direct device may be needed to form a P2P communication group. Furthermore, if the caller wireless device and the called wireless device each support LTE Direct, the wireless devices may be within sufficient range to communicate over a direct P2P connection if the estimated distance between the wireless devices is approximately 500 meters or less. Accordingly, the application server may make a threshold determination as to whether communication between the caller wireless device and the called wireless device can be offloaded to a direct P2P connection based on the estimated distance between the wireless devices and the P2P interfaces supported thereon, wherein the call may be handled over the network infrastructure at block 650 if the distance between the wireless devices exceeds the maximum range associated with the supported P2P interfaces associated with the wireless devices (e.g., if the estimated distance exceeds approximately 500 meters, the estimated distance exceeds approximately 100 meters and at least one wireless device does not support LTE Direct, etc.).

However, in the event that the estimated distance between the wireless devices falls within the maximum range associated with the P2P interfaces that the wireless devices support, the application server may then determine whether sufficient resources to support P2P communication are available at block 630. For example, the resources considered at block 630 may comprise available battery life, link speed, processor speed, or other suitable resources (e.g., available minutes in a cellular data plan to the extent that P2P offloading over LTE Direct may be possible). In response to determining that the caller wireless device and the called wireless device each have sufficient resources to communicate over a direct P2P connection, the application server may then determine whether any applicable user, device-specific, and/or operator preferences permit P2P offloading and/or whether any such preferences should be used to control the specific P2P interface that the wireless devices should use to establish the direct connection. For example, as described in further detail above, end users may prefer to use Wi-Fi Direct to communicate faster or more efficiently than may be possible with LTE Direct or to avoid incurring charges against a cellular data plan, whereas an operator may prefer LTE Direct in order to collect data plan charges. In another example, a device may configure a default preference to use LTE Direct to preserve battery life or a dynamic preference to use LTE Direct when available battery drops below a threshold because LTE Direct offers substantial power savings relative to Wi-Fi Direct. In still another example, an operator preference may prohibit P2P offloading when a lawful intercept request has been received from appropriate authorities. At block 640, any applicable user, device-specific, and/or operator preferences may therefore be consulted to determine whether P2P offloading is permitted and/or the parameters that should be used in the P2P offloading if permitted.

Accordingly, in response to determining that the estimated distance between the wireless devices falls within the maximum range associated with the P2P interfaces supported on the wireless devices and further determining that the wireless devices have sufficient resources to communicate P2P and applicable user, device-specific, and/or operator preferences permit P2P offloading, the application server may then instruct the caller wireless device and the called wireless device to activate the appropriate P2P interfaces and communicate over a direct P2P connection. Otherwise, the application server may handle the call over the network infrastructure at block 650 if the distance between the wireless devices falls outside the maximum range associated with any supported P2P interfaces, the caller wireless device and/or the called wireless device lack sufficient resources to communicate over a direct P2P connection, or if any applicable user, device-specific, and/or operator preferences do not permit P2P offloading.

Figure 7A:
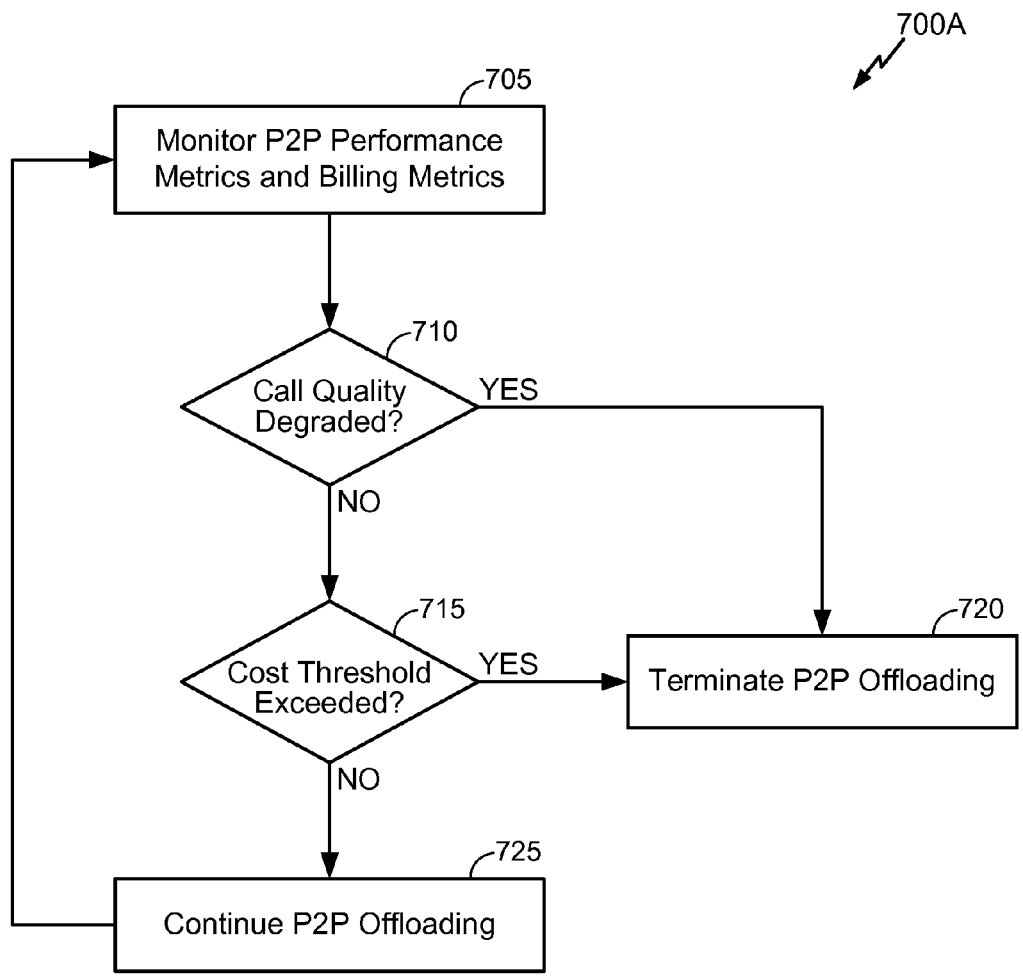
FIG. 7A illustrates an exemplary method that a server may perform to determine whether to terminate P2P offloading based on one or more performance and/or billing metrics associated with a P2P connection, according to one aspect of the disclosure.

According to one exemplary aspect, FIG. 7A illustrates an exemplary method 700A that the application server may perform to determine whether to terminate P2P offloading based on one or more performance and/or billing metrics associated with a P2P connection, wherein the method 700A shown in FIG. 7 may provide further detail relating to block 545 in FIG. 5. More particularly, subsequent to instructing a caller wireless device and a called wireless device to establish a direct P2P connection, the application server may receive periodic statistics and/or other reports from the wireless devices at block 705. As such, the application server may maintain connectivity with the wireless devices communicating over the direct P2P connection and monitor performance metrics and/or billing metrics associated with the P2P offloaded call to determine whether or not to terminate the P2P offloading. For example, in one embodiment, the application server may determine whether quality associated with the P2P call has degraded or will likely degrade at block 710, wherein the determination made at block 710 may depend on measurement reports received from the wireless devices, available link speeds or other resources, changes in the locations associated with the wireless devices, or other suitable criteria that may indicate the performance associated with the call. In particular, the quality associated with the P2P offloaded call may generally depend on performance metrics that are based on the network connection between the caller and the called wireless device, whereby the reports received from the caller and the called wireless device may be analyzed to monitor the performance metrics associated with the call. For example, in various embodiments and/or use cases, the performance metrics may comprise a maximum jitter (e.g., variations in the delay at which packets are received), a maximum latency (e.g., the time that packets take to travel from one wireless device to another), a maximum packet loss (e.g., a lost packet percentage), and/or other suitable performance metrics (e.g., a R-Factor quality rating derived from the jitter, latency, packet loss, and/or other metrics to produce a value that typically falls in a range between 50-100, a Mean Opinion Score (MOS) that measures subjective call quality in a scale from 1 to 5 based on ITU-T Recommendation P.800, etc.).

Furthermore, in one embodiment, the application server may evaluate any changes in the locations and/or the P2P capabilities and preferences that control the P2P offloading at block 710 in a substantially similar manner to how the application server initially determines whether the call can be offloaded from the network infrastructure, as described in further detail above. For example, if the caller and the called wireless devices were initially determined to be less than 100 meters apart and therefore instructed to establish a Wi-Fi Direct connection and the caller and/or the called wireless device change locations such that the estimated distance falls in a range between 100-500 meters, the application server may terminate the P2P offloading if either or both wireless devices do not have P2P interfaces that support LTE Direct or if any applicable preferences do not permit changing the P2P connection to LTE Direct even if both wireless devices support LTE Direct. In another example, if the reports received from the caller and/or the called wireless device indicate that one or the another has a low battery, the P2P offloading may be determined if communicating over the network infrastructure would consume less power.

Accordingly, in response to determining that the call quality has degraded or will likely degrade soon at block 710 (e.g., based on the monitored performance metrics, changes in the locations, P2P capabilities, preferences, and/or other criteria that control the P2P offloading, etc.), the application server may terminate the P2P offloading and handle the call over the network infrastructure at block 720. Otherwise, in response to determining that the call quality has not degraded and will likely continue satisfy the criteria that control the P2P offloading, the application server may determine whether any applicable cost metrics have been exceeded at block 715. For example, in one embodiment, the cost metrics may specify a maximum cost-per-minute, a maximum total cost, or another suitable constraint that may limit the amount that the wireless devices will be charged to communicate over the direct P2P connection, which may generally be greater when using LTE Direct because the call may be charges against a cellular data plan, whereas devices communicating over Wi-Fi Direct may have a smaller administration overhead because the devices can connect to one another without requiring a wireless access point.

As such, in response to determining that any applicable cost thresholds have been exceeded, the application server may terminate the P2P offloading and handle the call over the network infrastructure at block 720. Alternatively, in response to determining that the call quality has not degraded and that any applicable cost thresholds have not been exceeded, the application server may allow the P2P offloading to continue at block 725, wherein the method 700A may then return to block 705 to monitor the performance metrics and billing metrics associated with the offloaded P2P call based on periodic reports received from the wireless devices and/or other suitable criteria.

Figure 7B:
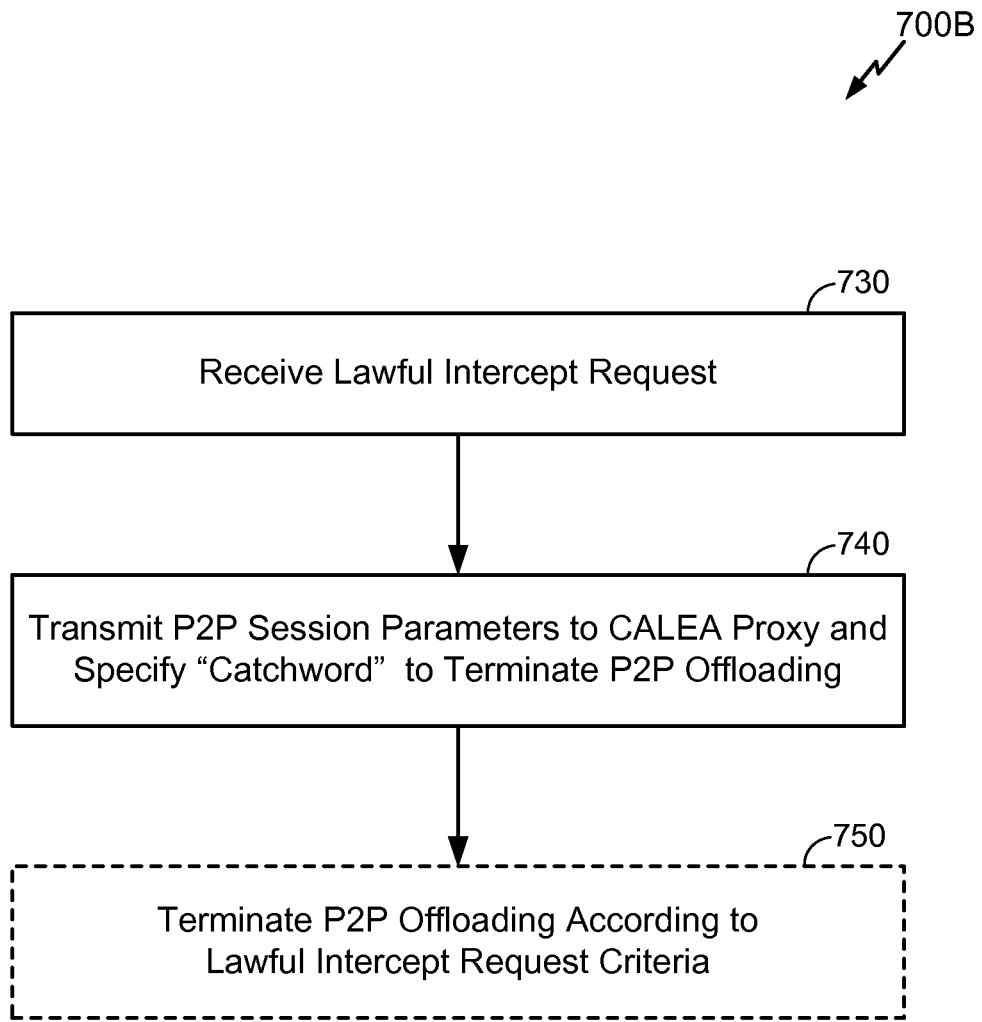
FIG. 7B illustrates an exemplary method that a server may perform to determine whether to terminate P2P offloading based on a lawful intercept request, according to one aspect of the disclosure.

For example, according to one exemplary aspect, FIG. 7B illustrates another exemplary method 700B that the application server may perform to determine whether to terminate P2P offloading, wherein the criteria used therein to trigger terminating the P2P offloading may include a lawful intercept request rather than performance and/or billing metrics. In particular, various nations and localities have passed laws and regulations requiring network operators and telecommunications equipment manufacturers to configure equipment, facilities, and services in a manner that may allow law enforcement agencies to conduct surveillance to monitor telephone, broadband, and VoIP traffic in real-time. For example, in the United States, the Communications Assistance for Law Enforcement Act (CALEA) specifies requirements to add CALEA-compliant interfaces to telecommunications equipment and the European Union has accepted a resolution mandating similar measures to CALEA.

Accordingly, in response to receiving a lawful intercept request at block 730, the application server may then initiate appropriate procedures to comply with the lawful intercept request. In particular, under CALEA, a lawful intercept request must generally identify a subscriber named in an intercept warrant, whereby the application server may determine whether the lawful intercept request received at block 730 identifies the subscriber associated with at least one wireless device engaged in the P2P offloaded communication. In the affirmative, the application server may then find a local law enforcement proxy (e.g., a CALEA proxy) in sufficient proximity to eavesdrop on the offloaded communication. More particularly, at block 740, the application server may transmit the encryption keys and any other appropriate P2P session parameters associated with the offloaded P2P communication to the local law enforcement proxy and thereby enable the local law enforcement proxy to snoop on the P2P offloaded traffic. For example, in one embodiment, the local law enforcement proxy may operate as a session border controller (SBC) or other relay node between the P2P parties such that the law enforcement proxy may snoop on the P2P offloaded traffic that passes through the SBC or other relay node. In another example, the local law enforcement proxy may query the P2P parties to receive intermittent reports that can be analyzed to conduct the appropriate surveillance. Furthermore, in one embodiment, the lawful intercept request may specify a "catchword" or other triggering conditions to terminate the P2P offloading and move to a server-hosted call. Accordingly, at block 740, the application server may further send appropriate instructions to trigger terminating the P2P offloading to the wireless devices communicating over the direct P2P connection (typically in a manner that the end users cannot detect so as to not make the end users aware of the fact that the communication is subject to surveillance).

In one embodiment, the application server may optionally further terminate the P2P offloading according to the criteria in the lawful intercept request at block 750. For example, the law enforcement agency may express a preference to have the call routed over the network infrastructure to avoid the need to intervene in what the end users may believe to be a private P2P communication and thereby raise suspicions that surveillance may be ongoing. In another example, the P2P offloading may be terminated in response to the calling parties speaking the "catchword" that was specified to trigger moving to a server-hosted call. In the event that the application server terminates the P2P offloading at block 740, the application server may further employ any appropriate measures that may be needed to comply with the lawful intercept request (e.g., sending the intermittent reports from the calling parties, some or all content exchanged between the parties, etc. to the law enforcement agency).

Figure 8:
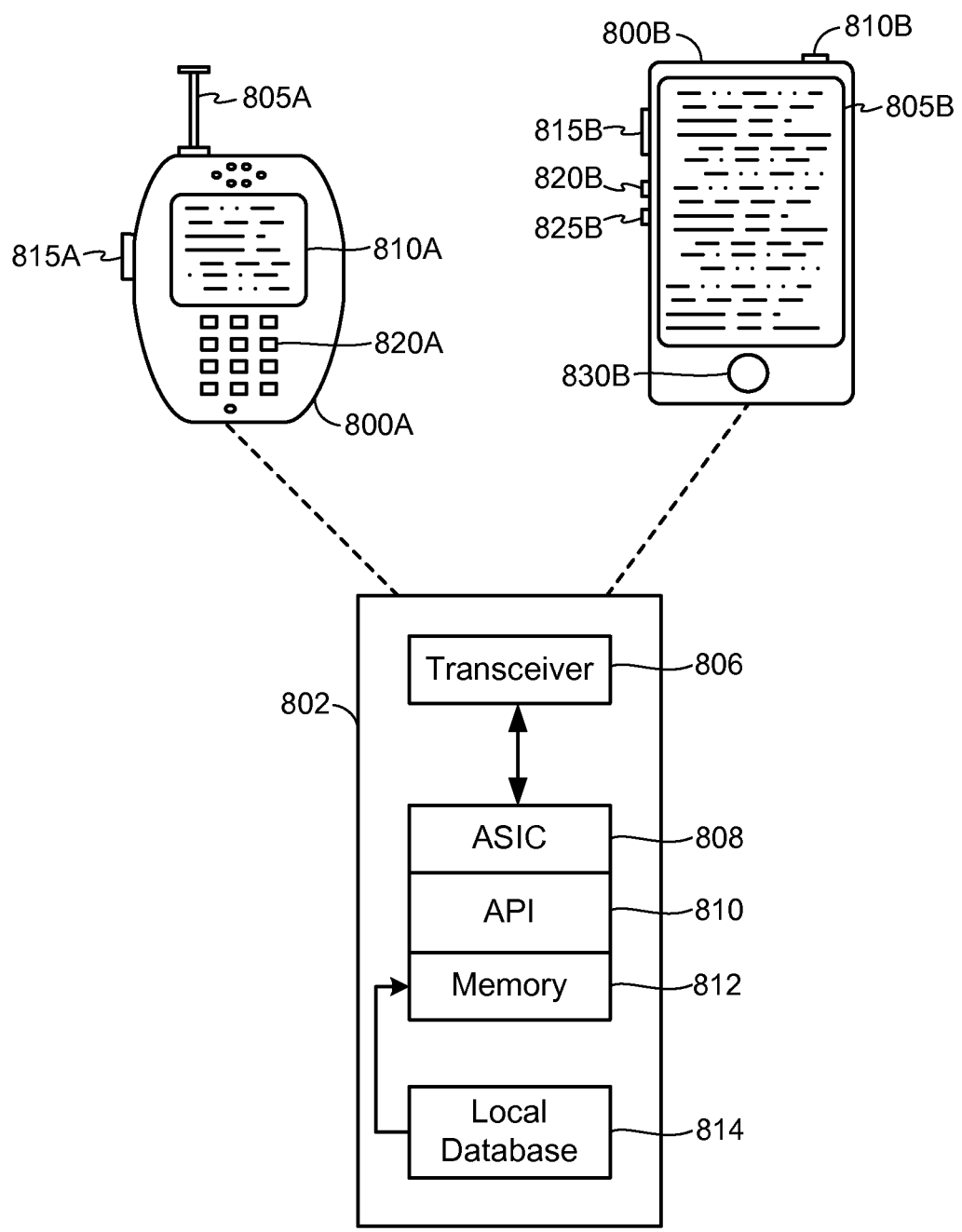
FIG. 8 illustrates examples of user equipments (UEs), according to one aspect of the disclosure.

FIG. 8 illustrates examples of UEs according to one aspect of the disclosure. Referring to FIG. 8, UE 800A is illustrated as a calling telephone and UE 800B is illustrated as a touchscreen device (e.g., a smart phone, a tablet computer, etc.). As shown in FIG. 8, an external casing of UE 800A is configured with an antenna 805A, display 810A, at least one button 815A (e.g., a PTT button, a power button, a volume control button, etc.) and a keypad 820A among other components, as is known in the art. Also, an external casing of UE 800B is configured with a touchscreen display 805B, peripheral buttons 810B, 815B, 820B and 825B (e.g., a power control button, a volume or vibrate control button, an airplane mode toggle button, etc.), at least one front-panel button 830B (e.g., a Home button, etc.), among other components, as is known in the art. While not shown explicitly as part of UE 800B, the UE 800B can include one or more external antennas and/or one or more integrated antennas that are built into the external casing of UE 800B, including but not limited to Wi-Fi antennas, cellular antennas, satellite position system (SPS) antennas (e.g., global positioning system (GPS) antennas), and so on.

While internal components of UEs such as the UEs 800A and 800B can be embodied with different hardware configurations, a basic high-level UE configuration for internal hardware components is shown as platform 802 in FIG. 8. The platform 802 can receive and execute software applications, data and/or commands transmitted from the RAN 120 that may ultimately come from the core network 140, the Internet 175 and/or other remote servers and networks (e.g., application server 170, web URLs, etc.). The platform 802 can also independently execute locally stored applications without RAN interaction. The platform 802 can include a transceiver 806 operably coupled to an application specific integrated circuit (ASIC) 808, or other processor, microprocessor, logic circuit, or other data processing device. The ASIC 808 or other processor executes the application programming interface (API) 810 layer that interfaces with any resident programs in the memory 812 of the wireless device. The memory 812 can be comprised of read-only or random-access memory (RAM and ROM), EEPROM, flash cards, or any memory common to computer platforms. The platform 802 also can include a local database 814 that can store applications not actively used in memory 812, as well as other data. The local database 814 is typically a flash memory cell, but can be any secondary storage device as known in the art, such as magnetic media, EEPROM, optical media, tape, soft or hard disk, or the like.

Accordingly, one embodiment disclosed herein can include a UE (e.g., UE 800A, 800B, etc.) including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 808, memory 812, API 810 and local database 814 may all be used cooperatively to load, store and execute the various functions disclosed herein and thus the logic to perform these functions may be distributed over various elements. Alternatively, the functionality could be incorporated into one discrete component. Therefore, the features of the UEs 800A and 800B in FIG. 8 are to be considered merely illustrative and the disclosure is not limited to the illustrated features or arrangement.

The wireless communication between the UEs 800A and/or 800B and the RAN 120 can be based on different technologies, such as CDMA, W-CDMA, time division multiple access (TDMA), frequency division multiple access (FDMA), Orthogonal Frequency Division Multiplexing (OFDM), GSM, or other protocols that may be used in a wireless communications network or a data communications network. As discussed in the foregoing and known in the art, voice transmission and/or data can be transmitted to the UEs from the RAN using a variety of networks and configurations. Accordingly, the illustrations provided herein are not intended to limit the embodiments disclosed herein and are merely to aid in describing aspects of the embodiments disclosed herein.

Figure 9:
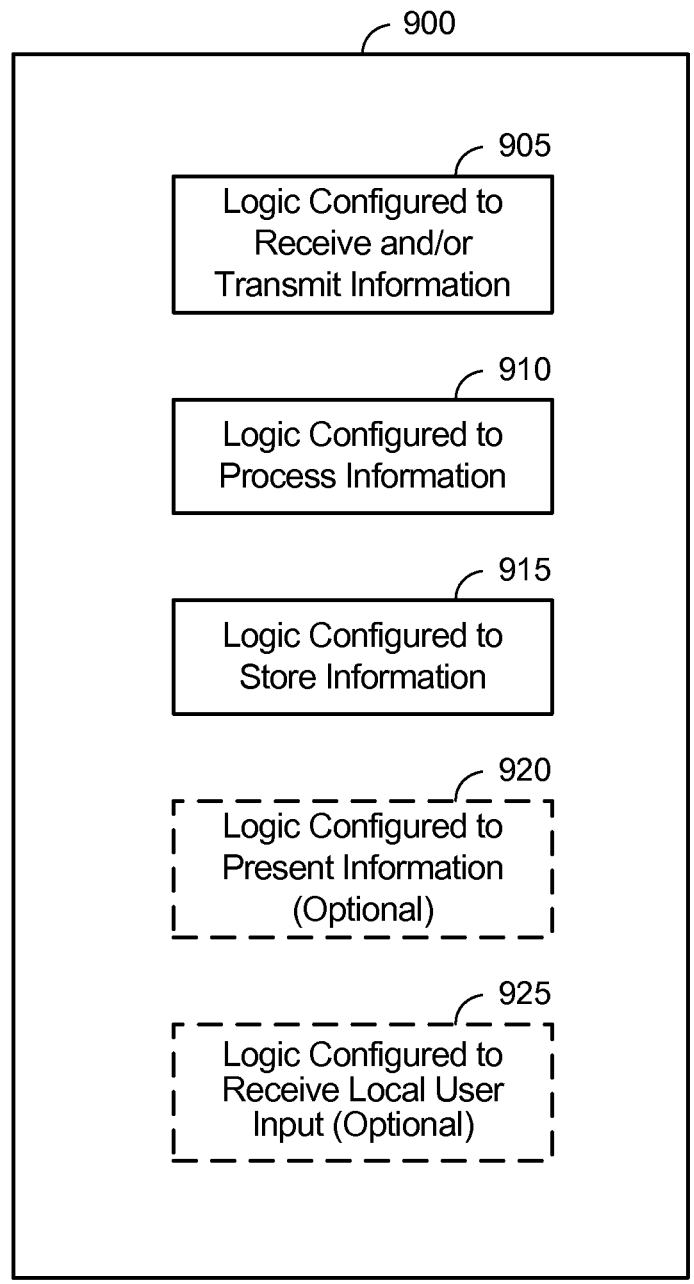
FIG. 9 illustrates a communication device that includes logic configured to perform functionality, according to one aspect of the disclosure.

FIG. 9 illustrates a communication device 900 that includes logic configured to perform functionality. The communication device 900 can correspond to any of the above-noted communication devices, including but not limited to UEs 800A or 800B, any component of the RAN 120 (e.g., BSs 200A through 210A, BSC 215A, Node Bs 200B through 210B, RNC 215B, eNodeBs 200D through 210D, etc.), any component of the core network 140 (e.g., PCF 220A, PDSN 225A, SGSN 220B, GGSN 225B, MME 215D or 220D, HSS 225D, S-GW 230D, P-GW 235D, PCRF 240D), any components coupled with the core network 140 and/or the Internet 175 (e.g., the application server 170), and so on. Thus, communication device 900 can correspond to any electronic device that is configured to communicate with (or facilitate communication with) one or more other entities over the wireless communications system 100 of FIG. 1.

Referring to FIG. 9, the communication device 900 includes logic configured to receive and/or transmit information 905. In an example, if the communication device 900 corresponds to a wireless communications device (e.g., UE 800A or 800B, one of BSs 200A through 210A, one of Node Bs 200B through 210B, one of eNodeBs 200D through 210D, etc.), the logic configured to receive and/or transmit information 905 can include a wireless communications interface (e.g., Bluetooth, Wi-Fi, 2G, CDMA, W-CDMA, 3G, 4G, LTE, etc.) such as a wireless transceiver and associated hardware (e.g., an RF antenna, a MODEM, a modulator and/or demodulator, etc.). In another example, the logic configured to receive and/or transmit information 905 can correspond to a wired communications interface (e.g., a serial connection, a USB or Firewire connection, an Ethernet connection through which the Internet 175 can be accessed, etc.). Thus, if the communication device 900 corresponds to some type of network-based server (e.g., PDSN, SGSN, GGSN, S-GW, P-GW, MME, HSS, PCRF, the application 170, etc.), the logic configured to receive and/or transmit information 905 can correspond to an Ethernet card, in an example, that connects the network-based server to other communication entities via an Ethernet protocol. In a further example, the logic configured to receive and/or transmit information 905 can include sensory or measurement hardware by which the communication device 900 can monitor its local environment (e.g., an accelerometer, a temperature sensor, a light sensor, an antenna for monitoring local RF signals, etc.). The logic configured to receive and/or transmit information 905 can also include software that, when executed, permits the associated hardware of the logic configured to receive and/or transmit information 905 to perform its reception and/or transmission function(s). However, the logic configured to receive and/or transmit information 905 does not correspond to software alone, and the logic configured to receive and/or transmit information 905 relies at least in part upon hardware to achieve its functionality.

Referring to FIG. 9, the communication device 900 further includes logic configured to process information 910. In an example, the logic configured to process information 910 can include at least a processor. Example implementations of the type of processing that can be performed by the logic configured to process information 910 includes but is not limited to performing determinations, establishing connections, making selections between different information options, performing evaluations related to data, interacting with sensors coupled to the communication device 900 to perform measurement operations, converting information from one format to another (e.g., between different protocols such as .wmv to .avi, etc.), and so on. For example, the processor included in the logic configured to process information 910 can correspond to a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 910 can also include software that, when executed, permits the associated hardware of the logic configured to process information 910 to perform its processing function(s). However, the logic configured to process information 910 does not correspond to software alone, and the logic configured to process information 910 relies at least in part upon hardware to achieve its functionality.

Referring to FIG. 9, the communication device 900 further includes logic configured to store information 915. In an example, the logic configured to store information 915 can include at least a non-transitory memory and associated hardware (e.g., a memory controller, etc.). For example, the non-transitory memory included in the logic configured to store information 915 can correspond to RAM memory, flash memory, ROM memory, EPROM memory, EEPROM memory, registers, hard disk, a removable disk, a CD-ROM, or any other form of storage medium known in the art. The logic configured to store information 915 can also include software that, when executed, permits the associated hardware of the logic configured to store information 915 to perform its storage function(s). However, the logic configured to store information 915 does not correspond to software alone, and the logic configured to store information 915 relies at least in part upon hardware to achieve its functionality.

Referring to FIG. 9, the communication device 900 further optionally includes logic configured to present information 920. In an example, the logic configured to present information 920 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 900. For example, if the communication device 900 corresponds to UE 800A or UE 800B as shown in FIG. 8, the logic configured to present information 920 can include the display 810A of UE 800A or the touchscreen display 805B of UE 800B. In a further example, the logic configured to present information 920 can be omitted for certain communication devices, such as network communication devices that do not have a local user (e.g., network switches or routers, remote servers, etc.). The logic configured to present information 920 can also include software that, when executed, permits the associated hardware of the logic configured to present information 920 to perform its presentation function(s). However, the logic configured to present information 920 does not correspond to software alone, and the logic configured to present information 920 relies at least in part upon hardware to achieve its functionality.

Referring to FIG. 9, the communication device 900 further optionally includes logic configured to receive local user input 925. In an example, the logic configured to receive local user input 925 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 900. For example, if the communication device 900 corresponds to UE 800A or UE 800B as shown in FIG. 8, the logic configured to receive local user input 925 can include the keypad 820A, any of the buttons 815A or 810B through 825B, the touchscreen display 805B, etc. In a further example, the logic configured to receive local user input 925 can be omitted for certain communication devices, such as network communication devices that do not have a local user (e.g., network switches or routers, remote servers, etc.). The logic configured to receive local user input 925 can also include software that, when executed, permits the associated hardware of the logic configured to receive local user input 925 to perform its input reception function(s). However, the logic configured to receive local user input 925 does not correspond to software alone, and the logic configured to receive local user input 925 relies at least in part upon hardware to achieve its functionality.

Referring to FIG. 9, while the configured logics of 905 through 925 are shown as separate or distinct blocks in FIG. 9, it will be appreciated that the hardware and/or software by which the respective configured logic performs its functionality can overlap in part. For example, any software used to facilitate the functionality of the configured logics of 905 through 925 can be stored in the non-transitory memory associated with the logic configured to store information 915, such that the configured logics of 905 through 925 each performs their functionality (i.e., in this case, software execution) based in part upon the operation of software stored by the logic configured to store information 915. Likewise, hardware that is directly associated with one of the configured logics can be borrowed or used by other configured logics from time to time. For example, the processor of the logic configured to process information 910 can format data into an appropriate format before being transmitted by the logic configured to receive and/or transmit information 905, such that the logic configured to receive and/or transmit information 905 performs its functionality (i.e., in this case, transmission of data) based in part upon the operation of hardware (i.e., the processor) associated with the logic configured to process information 910.

Generally, unless stated otherwise explicitly, the phrase "logic configured to" as used throughout this disclosure is intended to invoke an embodiment that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to those skilled in the art from a review of the embodiments described above in more detail.

Figure 10:
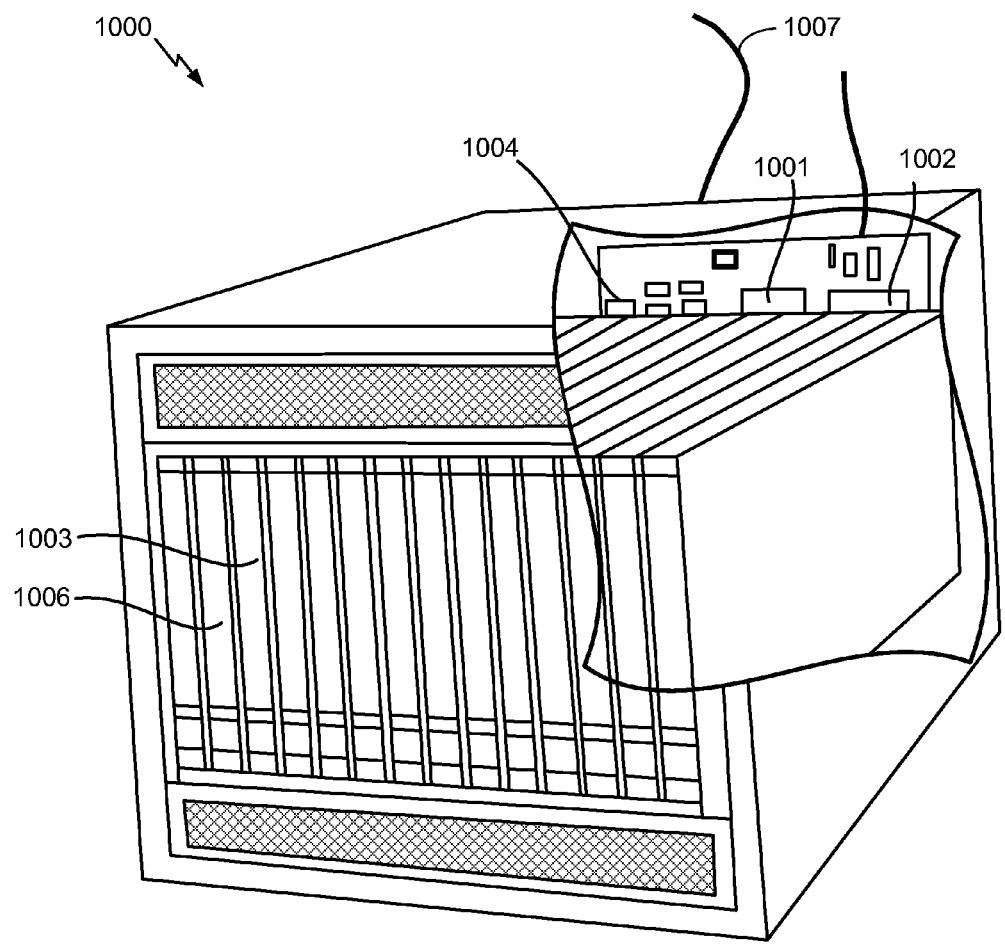
FIG. 10 illustrates an exemplary server, according to one aspect of the disclosure.

The various embodiments disclosed herein may be implemented on any of a variety of commercially available server devices, such as server 1000 illustrated in FIG. 10. In an example, the server 1000 may correspond to one example configuration of the application server described above. In FIG. 10, the server 1000 includes a processor 1001 coupled to volatile memory 1002 and a large capacity nonvolatile memory, such as a disk drive 1003. The server 1000 may also include a floppy disc drive, compact disc (CD) or DVD disc drive 1006 coupled to the processor 1001. The server 1000 may also include network access ports 1004 coupled to the processor 1001 for establishing data connections with a network 1007, such as a local area network coupled to other broadcast system computers and servers or to the Internet. In context with FIG. 9, it will be appreciated that the server 1000 of FIG. 10 illustrates one example implementation of the communication device 900, whereby the logic configured to transmit and/or receive information 905 may correspond to the network access points 1004 used by the server 1000 to communicate with the network 1007, the logic configured to process information 910 may correspond to the processor 1001, and the logic configuration to store information 915 may correspond to any combination of the volatile memory 1002, the disk drive 1003 and/or the disc drive 1006. The optional logic configured to present information 920 and the optional logic configured to receive local user input 925 are not shown explicitly in FIG. 10 and may or may not be included therein. Thus, FIG. 10 helps to demonstrate that the communication device 900 described above in connection with FIG. 9 may be implemented as a server, in addition to a UE implementation, such as the UE 800A or 800B shown in FIG. 8.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The methods, sequences and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in an IoT device. In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, DVD, floppy disk and Blu-ray disc where disks usually reproduce data magnetically and/or optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method for offloading communication from a network infrastructure, comprising:
    receiving first location information from a first wireless device and second location information from a second wireless device over the network infrastructure;
    predicting that the first wireless device intends to communicate with the second wireless device based on one or more reports received from the first wireless device that describe an activity on the first wireless device;
    determining, in response to the predicting, whether communication between the first wireless device and the second wireless device is able to be offloaded from the network infrastructure based at least in part on the first location information received from the first wireless device and the second location information received from the second wireless device; and
    instructing the first wireless device and the second wireless device to communicate over a peer-to-peer connection that bypasses the network infrastructure in response to determining that the communication between the first wireless device and the second wireless device is able to be offloaded from the network infrastructure.

2. The method recited in claim 1, further comprising:
    receiving, from the first wireless device, a call request that indicates an intent to communicate with the second wireless device over the network infrastructure, wherein the call request includes the first location information associated with the first wireless device.

3. The method recited in claim 2, further comprising:
    requesting that the second wireless device update the second location information associated therewith in response to determining that a most recent location update from the second wireless device was received before a predetermined time.

4. The method recited in claim 1, further comprising:
    maintaining connectivity with the first wireless device and the second wireless device while the first wireless device and the second wireless device communicate over the peer-to-peer connection such that the first wireless device and the second wireless device are directed to communicate over the network infrastructure in response to one or more trigger events.

5. The method recited in claim 1, wherein determining whether the communication between the first wireless device and the second wireless device is able to be offloaded from the network infrastructure further comprises:
    estimating a distance between the first wireless device and the second wireless device based on the first location information received from the first wireless device and the second location information received from the second wireless device;
    identifying one or more peer-to-peer technologies supported on both the first wireless device and the second wireless device based on one or more peer-to-peer status reports received from the first wireless device and the second wireless device; and
    determining that the communication between the first wireless device and the second wireless device is able to be offloaded from the network infrastructure in response to the estimated distance falling within a range associated with the one or more peer-to-peer technologies supported on both the first wireless device and the second wireless device.

6. The method recited in claim 5, further comprising:
    updating the estimated distance between the first wireless device and the second wireless device based on updated location information included in one or more intermittent reports received from the first wireless device and the second wireless device;
    instructing the first wireless device and the second wireless device to communicate over the network infrastructure in response to the updated estimated distance falling outside the range associated with the one or more peer-to-peer technologies supported on both the first wireless device and the second wireless device.

7. The method recited in claim 5, wherein the one or more peer-to-peer status reports further include peer-to-peer identifiers associated with the first wireless device and the second wireless device, information indicating an operating status associated with one or more peer-to-peer technologies supported on both the first wireless device and the second wireless device, and status information associated with available resources on the first wireless device and the second wireless device.

8. The method recited in claim 1, further comprising:
    monitoring one or more performance metrics associated with the peer-to-peer connection between the first wireless device and the second wireless device; and
    instructing the first wireless device and the second wireless device to communicate over the network infrastructure in response to the monitored one or more performance metrics indicating that quality associated with the peer-to-peer connection has degraded.

9. A method for offloading communication from a network infrastructure, comprising:
    receiving first location information from a first wireless device and second location information from a second wireless device over the network infrastructure;

estimating a distance between the first wireless device and the second wireless device based on the first location information received from the first wireless device and the second location information received from the second wireless device;

identifying multiple peer-to-peer technologies supported on both the first wireless device and the second wireless device based on one or more peer-to-peer status reports received from the first wireless device and the second wireless device;

determining that a communication between the first wireless device and the second wireless device is able to be offloaded from the network infrastructure in response to the estimated distance falling within a range associated with at least one of the multiple peer-to-peer technologies supported on both the first wireless device and the second wireless device;

selecting, among the multiple peer-to-peer technologies supported on both the first wireless device and the second wireless device, a peer-to-peer technology that the first wireless device and the second wireless device use to establish a peer-to-peer connection that bypasses the network infrastructure according to one or more preferences in response to determining that the estimated distance between the first wireless device and the second wireless device falls within a range associated with each of the multiple peer-to-peer technologies supported on both the first wireless device and the second wireless device; and instructing the first wireless device and the second wireless device to communicate over the peer-to-peer connection via the selected peer-to-peer technology in response to determining that the communication between the first wireless device and the second wireless device is able to be offloaded from the network infrastructure.

10. A method recited for offloading communication from a network infrastructure, comprising:

receiving first location information from a first wireless device and second location information from a second wireless device over the network infrastructure;

determining whether communication between the first wireless device and the second wireless device is able to be offloaded from the network infrastructure based at least in part on the first location information received from the first wireless device and the second location information received from the second wireless device;

instructing the first wireless device and the second wireless device to communicate over a peer-to-peer connection that bypasses the network infrastructure in response to determining that the communication between the first wireless device and the second wireless device is able to be offloaded from the network infrastructure;

monitoring one or more billing metrics associated with the peer-to-peer connection between the first wireless device and the second wireless device; and instructing the first wireless device and the second wireless device to communicate over the network infrastructure in response to the monitored one or more billing metrics indicating that communication over the peer-to-peer connection exceeds a cost threshold.

11. A method recited for offloading communication from a network infrastructure, comprising:

receiving first location information from a first wireless device and second location information from a second wireless device over the network infrastructure;

determining whether communication between the first wireless device and the second wireless device is able to be offloaded from the network infrastructure based at least in part on the first location information received from the first wireless device and the second location information received from the second wireless device; and instructing the first wireless device and the second wireless device to communicate over a peer-to-peer connection that bypasses the network infrastructure in response to determining that the communication between the first wireless device and the second wireless device is able to be offloaded from the network infrastructure;

receiving a lawful intercept request that identifies a subscriber associated with at least one of the first wireless device or the second wireless device; and instructing the first wireless device and the second wireless device to communicate over the network infrastructure in response to receiving the lawful intercept request.

12. The method recited in claim 11, further comprising:

transmitting one or more keys used to encrypt communication over the peer-to-peer connection to a law enforcement agency in response to the lawful intercept request, wherein the one or more keys enable the law enforcement agency to conduct surveillance on the communication over the peer-to-peer connection.

13. An apparatus, comprising:

a receiver configured to receive first location information from a first wireless device and second location information from a second wireless device over a network infrastructure and to receive one or more reports from the first wireless device that describe an activity on the first wireless device;

one or more processors configured to determine, in response to a prediction that the first wireless device intends to communicate with the second wireless device based on the one or more reports received from the first wireless device, whether communication between the first wireless device and the second wireless device is able to be offloaded from the network infrastructure based at least in part on the first location information received from the first wireless device and the second location information received from the second wireless device; and a transmitter configured to transmit a message instructing the first wireless device and the second wireless device to communicate over a peer-to-peer connection that bypasses the network infrastructure in response to determining that the communication between the first wireless device and the second wireless device is able to be offloaded from the network infrastructure.

14. The apparatus recited in claim 13, wherein the one or more processors are further configured to:

estimate a distance between the first wireless device and the second wireless device based on the first location information received from the first wireless device and the second location information received from the second wireless device;

identify one or more peer-to-peer technologies supported on both the first wireless device and the second wireless device based on one or more peer-to-peer status reports received from the first wireless device and the second wireless device; and determine that the communication between the first wireless device and the second wireless device is able to be offloaded from the network infrastructure in response to the estimated distance falling within a range associated with the one or more peer-to-peer technologies supported on both the first wireless device and the second wireless device.

15. The apparatus recited in claim 14, wherein:
the one or more processors are further configured to update the estimated distance between the first wireless device and the second wireless device based on updated location information included in one or more intermittent reports received from the first wireless device and the second wireless device, and
the transmitter is further configured to transmit a message instructing the first wireless device and the second wireless device to communicate over the network infrastructure in response to the one or more processors determining that the updated estimated distance falls outside the range associated with the one or more peer-to-peer technologies supported on both the first wireless device and the second wireless device.

16. An apparatus, comprising:
a receiver configured to receive first location information from a first wireless device and second location information from a second wireless device over a network infrastructure;
one or more processors configured to:
  estimate a distance between the first wireless device and the second wireless device based on the first location information received from the first wireless device and the second location information received from the second wireless device;
  identify multiple peer-to-peer technologies supported on both the first wireless device and the second wireless device based on one or more peer-to-peer status reports received from the first wireless device and the second wireless device;
  determine that a communication between the first wireless device and the second wireless device is able to be offloaded from the network infrastructure in response to the estimated distance falling within a range associated with at least one of the multiple peer-to-peer technologies supported on both the first wireless device and the second wireless device; and
  select, among the multiple peer-to-peer technologies supported on both the first wireless device and the second wireless device, a peer-to-peer technology that the first wireless device and the second wireless device use to establish a peer-to-peer connection that bypasses the network infrastructure according to one or more preferences in response to the estimated distance between the first wireless device and the second wireless device falling within a range associated with each of the multiple peer-to-peer technologies supported on both the first wireless device and the second wireless device; and
a transmitter configured to transmit a message instructing the first wireless device and the second wireless device to communicate over the peer-to-peer connection via the selected peer-to-peer technology in response to determining that the communication between the first wireless device and the second wireless device is able to be offloaded from the network infrastructure.

17. An apparatus, comprising:
a receiver configured to receive first location information from a first wireless device and second location information from a second wireless device over a network infrastructure;
one or more processors configured to determine whether communication between the first wireless device and the second wireless device is able to be offloaded from the network infrastructure based at least in part on the first location information received from the first wireless device and the second location information received from the second wireless device; and
a transmitter configured to transmit a first message instructing the first wireless device and the second wireless device to communicate over a peer-to-peer connection that bypasses the network infrastructure in response to determining that the communication between the first wireless device and the second wireless device is able to be offloaded from the network infrastructure, wherein the one or more processors are further configured to monitor one or more billing metrics associated with the peer-to-peer connection between the first wireless device and the second wireless device, and wherein the transmitter is further configured to transmit a second message instructing the first wireless device and the second wireless device to communicate over the network infrastructure in response to the monitored one or more billing metrics indicating that communication over the peer-to-peer connection exceeds a cost threshold.

18. An apparatus, comprising:
a receiver configured to receive first location information from a first wireless device and second location information from a second wireless device over a network infrastructure;
one or more processors configured to determine whether communication between the first wireless device and the second wireless device is able to be offloaded from the network infrastructure based at least in part on the first location information received from the first wireless device and the second location information received from the second wireless device; and
a transmitter configured to transmit a first message instructing the first wireless device and the second wireless device to communicate over a peer-to-peer connection that bypasses the network infrastructure in response to determining that the communication between the first wireless device and the second wireless device is able to be offloaded from the network infrastructure, wherein the receiver is further configured to receive a lawful intercept request that identifies a subscriber associated with at least one of the first wireless device or the second wireless device, and wherein the transmitter is further configured to transmit a second message instructing the first wireless device and the second wireless device to communicate over the network infrastructure in response to the received lawful intercept request.

19. An apparatus, comprising:
means for receiving first location information from a first wireless device and second location information from a second wireless device over a network infrastructure;
means for predicting that the first wireless device intends to communicate with the second wireless device based on one or more reports received from the first wireless device that describe an activity on the first wireless device;
means for determining, in response to the predicting, whether communication between the first wireless device and the second wireless device is able to be offloaded from the network infrastructure based at least in part on the first location information received from the first wireless device and the second location information received from the second wireless device; and
means for instructing the first wireless device and the second wireless device to communicate over a peer-to-peer connection that bypasses the network infrastructure in response to determining that the communication between the first wireless device and the second wireless device is able to be offloaded from the network infrastructure.

20. The apparatus recited in claim 19, further comprising:
means for estimating a distance between the first wireless device and the second wireless device based on the first location information received from the first wireless device and the second location information received from the second wireless device;
means for identifying one or more peer-to-peer technologies supported on both the first wireless device and the second wireless device based on one or more peer-to-peer status reports received from the first wireless device and the second wireless device; and
means for determining that the communication between the first wireless device and the second wireless device is able to be offloaded from the network infrastructure in response to the estimated distance falling within a range associated with the one or more peer-to-peer technologies supported on both the first wireless device and the second wireless device.

21. The apparatus recited in claim 20, further comprising:
means for updating the estimated distance between the first wireless device and the second wireless device based on updated location information included in one or more intermittent reports received from the first wireless device and the second wireless device; and
means for instructing the first wireless device and the second wireless device to communicate over the network infrastructure in response to the updated estimated distance falling outside the range associated with the one or more peer-to-peer technologies supported on both the first wireless device and the second wireless device.

22. An apparatus, comprising:
means for receiving first location information from a first wireless device and second location information from a second wireless device over a network infrastructure;
means for estimating a distance between the first wireless device and the second wireless device based on the first location information received from the first wireless device and the second location information received from the second wireless device;
means for identifying multiple peer-to-peer technologies supported on both the first wireless device and the second wireless device based on one or more peer-to-peer status reports received from the first wireless device and the second wireless device;
means for determining that a communication between the first wireless device and the second wireless device is able to be offloaded from the network infrastructure in response to the estimated distance falling within a range associated with at least one of the multiple peer-to-peer technologies supported on both the first wireless device and the second wireless device;
means for selecting, among the multiple peer-to-peer technologies supported on both the first wireless device and the second wireless device, a peer-to-peer technology that the first wireless device and the second wireless device use to establish a peer-to-peer connection that bypasses the network infrastructure according to one or more preferences in response to the estimated distance between the first wireless device and the second wireless device falling within a range associated with each of the multiple peer-to-peer technologies supported on both the first wireless device and the second wireless device; and
means for instructing the first wireless device and the second wireless device to communicate over the peer-to-peer connection via the selected peer-to-peer technology in response to determining that the communication between the first wireless device and the second wireless device is able to be offloaded from the network infrastructure.

23. An apparatus, comprising:
means for receiving first location information from a first wireless device and second location information from a second wireless device over a network infrastructure;
means for determining whether communication between the first wireless device and the second wireless device is able to be offloaded from the network infrastructure based at least in part on the first location information received from the first wireless device and the second location information received from the second wireless device;
means for instructing the first wireless device and the second wireless device to communicate over a peer-to-peer connection that bypasses the network infrastructure in response to determining that the communication between the first wireless device and the second wireless device is able to be offloaded from the network infrastructure;
means for monitoring one or more billing metrics associated with the peer-to-peer connection between the first wireless device and the second wireless device; and
means for instructing the first wireless device and the second wireless device to communicate over the network infrastructure in response to the monitored one or more billing metrics indicating that communication over the peer-to-peer connection exceeds a cost threshold.

24. An apparatus, comprising:
means for receiving first location information from a first wireless device and second location information from a second wireless device over a network infrastructure;
means for determining whether communication between the first wireless device and the second wireless device is able to be offloaded from the network infrastructure based at least in part on the first location information received from the first wireless device and the second location information received from the second wireless device;
means for instructing the first wireless device and the second wireless device to communicate over a peer-to-peer connection that bypasses the network infrastructure in response to determining that the communication between the first wireless device and the second wireless device is able to be offloaded from the network infrastructure;
means for receiving a lawful intercept request that identifies a subscriber associated with at least one of the first wireless device or the second wireless device; and
means for instructing the first wireless device and the second wireless device to communicate over the network infrastructure in response to the received lawful intercept request.

25. A non-transitory computer-readable storage medium having computer-executable instructions recorded thereon, wherein executing the computer-executable instructions on a server causes the server to:

receive first location information from a first wireless device and second location information from a second wireless device over a network infrastructure;

receive one or more reports from the first wireless device that describe an activity on the first wireless device;

determine, in response to a prediction that the first wireless device intends to communicate with the second wireless device based on the one or more reports received from the first wireless device, whether communication between the first wireless device and the second wireless device is able to be offloaded from the network infrastructure based at least in part on the first location information received from the first wireless device and the second location information received from the second wireless device; and instruct the first wireless device and the second wireless device to communicate over a peer-to-peer connection that bypasses the network infrastructure in response to determining that the communication between the first wireless device and the second wireless device is able to be offloaded from the network infrastructure.

26. The non-transitory computer-readable storage medium recited in claim 25, wherein executing the computer-executable instructions on the server further causes the server to:

estimate a distance between the first wireless device and the second wireless device based on the first location information received from the first wireless device and the second location information received from the second wireless device;

identify one or more peer-to-peer technologies supported on both the first wireless device and the second wireless device based on one or more peer-to-peer status reports received from the first wireless device and the second wireless device; and determine that the communication between the first wireless device and the second wireless device is able to be offloaded from the network infrastructure in response to the estimated distance falling within a range associated with the one or more peer-to-peer technologies supported on both the first wireless device and the second wireless device.

27. The non-transitory computer-readable storage medium recited in claim 26, wherein executing the computer-executable instructions on the server further causes the server to:

update the estimated distance between the first wireless device and the second wireless device based on updated location information included in one or more intermittent reports received from the first wireless device and the second wireless device; and instruct the first wireless device and the second wireless device to communicate over the network infrastructure in response to the updated estimated distance falling outside the range associated with the one or more peer-to-peer technologies supported on both the first wireless device and the second wireless device.

28. A non-transitory computer-readable storage medium having computer-executable instructions recorded thereon, wherein executing the computer-executable instructions on a server causes the server to:

receive first location information from a first wireless device and second location information from a second wireless device over a network infrastructure;

estimate a distance between the first wireless device and the second wireless device based on the first location information received from the first wireless device and the second location information received from the second wireless device;

identify multiple peer-to-peer technologies supported on both the first wireless device and the second wireless device based on one or more peer-to-peer status reports received from the first wireless device and the second wireless device;

determine that a communication between the first wireless device and the second wireless device is able to be offloaded from the network infrastructure in response to the estimated distance falling within a range associated with at least one of the multiple peer-to-peer technologies supported on both the first wireless device and the second wireless device;

select, among the multiple peer-to-peer technologies supported on both the first wireless device and the second wireless device, a peer-to-peer technology that the first wireless device and the second wireless device use to establish a peer-to-peer connection that bypasses the network infrastructure according to one or more preferences in response to the estimated distance between the first wireless device and the second wireless device falling within a range associated with each of the multiple peer-to-peer technologies supported on both the first wireless device and the second wireless device; and instruct the first wireless device and the second wireless device to communicate over the peer-to-peer connection via the selected peer-to-peer technology in response to determining that the communication between the first wireless device and the second wireless device is able to be offloaded from the network infrastructure.

29. A non-transitory computer-readable storage medium having computer-executable instructions recorded thereon, wherein executing the computer-executable instructions on a server causes the server to:

receive first location information from a first wireless device and second location information from a second wireless device over a network infrastructure;

determine whether communication between the first wireless device and the second wireless device is able to be offloaded from the network infrastructure based at least in part on the first location information received from the first wireless device and the second location information received from the second wireless device;

instruct the first wireless device and the second wireless device to communicate over a peer-to-peer connection that bypasses the network infrastructure in response to determining that the communication between the first wireless device and the second wireless device is able to be offloaded from the network infrastructure;

monitor one or more billing metrics associated with the peer-to-peer connection between the first wireless device and the second wireless device; and instruct the first wireless device and the second wireless device to communicate over the network infrastructure in response to the monitored one or more billing metrics indicating that communication over the peer-to-peer connection exceeds a cost threshold.

30. A non-transitory computer-readable storage medium having computer-executable instructions recorded thereon, wherein executing the computer-executable instructions on a server causes the server to:

receive first location information from a first wireless device and second location information from a second wireless device over a network infrastructure;

determine whether communication between the first wireless device and the second wireless device is able to be offloaded from the network infrastructure based at least in part on the first location information received from the first wireless device and the second location information received from the second wireless device;

instruct the first wireless device and the second wireless device to communicate over a peer-to-peer connection that bypasses the network infrastructure in response to determining that the communication between the first wireless device and the second wireless device is able to be offloaded from the network infrastructure;

receive a lawful intercept request that identifies a subscriber associated with at least one of the first wireless device or the second wireless device; and instruct the first wireless device and the second wireless device to communicate over the network infrastructure in response to the received lawful intercept request.

* * * * *